US008305373B2

(12) United States Patent
Ogura et al.

(10) Patent No.: US 8,305,373 B2
(45) Date of Patent: Nov. 6, 2012

(54) PIXEL DRIVING DEVICE AND A LIGHT EMITTING DEVICE

(75) Inventors: Jun Ogura, Fussa (JP); Manabu Takei, Sagamihara (JP); Shunji Kashiyama, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 200 days.

(21) Appl. No.: 12/626,756

(22) Filed: Nov. 27, 2009

(65) Prior Publication Data

US 2010/0134482 A1 Jun. 3, 2010

(30) Foreign Application Priority Data

Nov. 28, 2008 (JP) ................................ 2008-305716

(51) Int. Cl.
*G06F 3/038* (2006.01)

(52) U.S. Cl. ....................................... 345/211; 345/213

(58) Field of Classification Search ........................ None
See application file for complete search history.

(56) References Cited

U.S. PATENT DOCUMENTS

| | | | | |
|---|---|---|---|---|
| 7,701,421 | B2 | 4/2010 | Ogura | |
| 7,760,168 | B2 | 7/2010 | Ogura | |
| 7,907,105 | B2 * | 3/2011 | Shirasaki et al. | 345/77 |
| 2006/0221015 | A1 * | 10/2006 | Shirasaki et al. | 345/77 |
| 2007/0080905 | A1 * | 4/2007 | Takahara | 345/76 |
| 2008/0111812 | A1 | 5/2008 | Shirasaki et al. | |
| 2008/0238833 | A1 | 10/2008 | Hioki et al. | |
| 2008/0238953 | A1 * | 10/2008 | Ogura | 345/697 |
| 2008/0246785 | A1 * | 10/2008 | Shirasaki et al. | 345/690 |
| 2010/0134468 | A1 | 6/2010 | Ogura et al. | |
| 2010/0134469 | A1 | 6/2010 | Ogura et al. | |
| 2010/0134475 | A1 | 6/2010 | Ogura et al. | |

FOREIGN PATENT DOCUMENTS

| | | | |
|---|---|---|---|
| JP | 2002-156923 | A | 5/2002 |
| JP | 2007-322133 | A | 12/2007 |
| JP | 2008-107774 | A | 5/2008 |
| WO | WO 2006/104259 | A1 | 10/2006 |

OTHER PUBLICATIONS

U.S. Appl. No. 12/626,731, filed Nov. 27, 2009, entitled "A Pixel Driving Device, Light Emitting Device, and Property Parameter Acquisition Method in a Pixel Driving Device," Inventor: J. Ogura et al. U.S. Appl. No. 12/626,747, filed Nov. 27, 2009, entitled "A Pixel Driving Device, Light Emitting Device, and Property Parameter Acquisition Method in a Pixel Driving Device," Inventor: J. Ogura et al.

U.S. Appl. No. 12/626,752, filed Nov. 27, 2009, entitled "A Light Emitting Device and a Drive Control Method for Driving a Light Emitting Device," Inventor: J. Ogura et al.

International Search Report and Written Opinion of the International Searching Authority dated Mar. 10, 2010 (in English) issued in counterpart International Application No. PCT/JP2009/070373.

* cited by examiner

*Primary Examiner* — Jason Olson
(74) *Attorney, Agent, or Firm* — Holtz, Holtz, Goodman & Chick, PC

(57) ABSTRACT

A pixel driving device for drive control of pixels, has a image data conversion circuit for generating an original gradation signal by converting an image data, based on a preset conversion property, a signal correction circuit for outputting a corrected gradation signal by adding a correction value acquired based on an electric property parameter of a pixel to the original gradation signal, and a drive signal impressing circuit for impressing a voltage signal corresponding to the corrected gradation signal on one end of a signal line. The original gradation signal has a value that corresponds to a gradation value of the image data and the maximum value of the original gradation signal is set to a value equal to or smaller than a value acquired by subtracting a value corresponding to the correction value from a maximum value in an input range of the drive signal impressing circuit.

19 Claims, 18 Drawing Sheets

VI_0: $Id0 = \beta 0\,(Vdata - Vth0)^2$

VI_1: $Id1 = (\beta 0 - \Delta\beta)\,(Vdata - Vth0)^2$

VI_2: $Id2 = (\beta 0 + \Delta\beta)\,(Vdata - Vth0)^2$

VI_3: $Id3 = \beta 0\,(Vdata - (Vth0 + \Delta Vth))^2$

PIXEL DRIVING DEVICE AND A LIGHT EMITTING DEVICE

BACKGROUND OF THE INVENTION

1. Field of the Invention

The present invention relates to a pixel driving device and a light emitting device.

2. Description of the Related Art

Research and development has been gaining in popularity in recent years around light emitting element type display devices (light emitting element type display, light emitting device) that provide a display panel (pixel array) arranging light emitting elements in a matrix as the next generation of display device to succeed liquid crystal display devices.

Electric current driven type light emitting elements, such as organic electroluminescence elements (organic EL element) and inorganic electroluminescence elements (inorganic EL element), or a light emitting diode (LED), are known as this type of light emitting element.

A light emitting element type display device that applies an active matrix drive method, compared to known liquid crystal display devices, especially has characteristics which include faster display response speed, no viewing angle dependency, high brightness and superior contrast, and the ability for high resolution display picture quality.

In addition, a light emitting element type display device has an extremely advantageous characteristic in that further thinning of thin film becomes possible since, unlike a LCD device, a light emitting element type display device does not require a backlight or a light guide plate. Therefore, application on future electronics devices of this type is anticipated.

An organic EL display device with an active matrix driving method that controls electric current through voltage signals is disclosed in Unexamined Japanese Patent Application KOKAI Publication No. 2002-156923 as this type of light emitting element type display device.

The organic EL display device with an active matrix driving method equips each pixel with an organic EL element that is a light emitting element and with a pixel drive circuit having a current control thin film transistor to drive the organic EL element as well as a switching thin film transistor.

The current control thin film transistor controls the current value of the electric current that flows between the drain and the source of the current control thin film transistor by an impressed gate voltage after a voltage signal is impressed having a voltage value determined based on the image data of each pixel (hereinafter written as "voltage value based on the image data") on the current control terminal of the current control thin film transistor. This current, supplied to the organic EL element, causes the organic EL element to emit light. The switching thin film transistor executes switching to supply the voltage signal based on image data to the gate of the current control thin film transistor.

The properties of a current control thin film transistor in a display device constituted in this manner undergo chronological changes with use. Particularly, it is known that when the current control thin film transistor consists of an amorphous TFT (Thin Film Transistor), the threshold voltage Vth, which is one of the properties of that TFT, exhibits comparatively large chronological change.

Even impressing the current control thin film transistor gate with a voltage signal of the same voltage value for the same gradation value of image data with a constitution that controls the gradation of the displayed image by the voltage value of the voltage signal based on image data, the current value of the electric current that flows between the drain and the source of the current control thin film transistor changes when the threshold voltage Vth changes, thereby changing the brightness of the light emitted from the organic EL element of the display pixel with respect to the same gradation value of the image data.

Other property of a current control thin film transistor, for instance, irregularity in the current amplification factor β between pixels also affects the displayed image. The current value of the electric current that flows between the drain and the source of the current control thin film transistor is proportional to the current amplification factor β. Therefore, even if the threshold voltage of the current control thin film transistor for every pixel is the same, irregularity will occur in the current value of the electric current that flows between the drain and the source of the current control thin film transistor when irregularity happens in the current amplification factor β value originating in, for example, the manufacturing process, thereby creating irregularity in the brightness of the light emitted from the organic EL elements.

Irregularity in the current amplification factor is due to irregularity in mobility. Irregularity in mobility is especially prominent in low temperature polysilicon TFT's while this type of irregularity in amorphous silicon TFT's are comparatively low. However, even so, the affects of irregularity in mobility, i.e. current amplification factor β, originating in the manufacturing process cannot be avoided.

In this manner, changes to the threshold voltage Vth and irregularity in the current amplification factor β originating in the manufacturing process affect the image data reproducibility of the displayed image, namely, picture equality.

SUMMARY OF THE INVENTION

In order to control deterioration of picture quality due to these types of changes to the threshold voltage Vth and irregularity in the current amplification factor β originating in the manufacturing process, in the present invention the threshold voltage and current amplification factor β for each pixel, for example, are acquired as property parameters, and the voltage signal supplied to each pixel based on the supplied image data can be corrected based on this property parameter.

A pixel driving device for drive controlling a pixel, according to the present disclosure is a pixel driving device for driving a pixel, connected to a signal line, and comprising a light emitting element, and a drive transistor for controlling the current supplied to the light emitting element by one end of a current path of the drive transistor being connected to one end of the light emitting element, comprising:

a memory for storing property parameters that relate to the electrical properties of the pixel;

an image data conversion circuit that converts image data consisting of a digital signal based on a conversion property set in the image data conversion circuit and generates an original gradation signal consisting of a digital signal;

a signal correction circuit for outputting a corrected gradation signal consisting of a digital signal, by adding the correction amount set based on the value of the property parameter stored in the memory, to the original gradation signal; and a drive signal impressing circuit for generating a drive signal consisting of an analog signal based on the value of the corrected gradation signal after the corrected gradation signal is input, and impressing the drive signal on one end of the signal line;

wherein, the original gradation signal generated by the image data conversion circuit has a value that corresponds to the gradation value of the image data, and the maximum value of the original gradation signal is set to a value equal to or smaller than a value that is acquired by subtracting a value corresponding to the correction amount in the signal correction circuit from the maximum value in the input range of the drive signal impressing circuit.

A light emitting device according to the present disclosure is a light emitting device, comprising:

a pixel, connected to a signal line, having a light emitting element, and a drive transistor which is for controlling the current supplied to the light emitting element, and whose one end of a current path of the drive transistor is connected to one end of the light emitting element;

a memory for storing property parameters that relate to the electrical properties of the pixel;

an image data conversion circuit for converting the input image data consisting of a digital signal based on the preset conversion properties and generating an original gradation signal consisting of a digital signal;

a signal correction circuit for outputting a corrected gradation signal consisting of a digital signal, by adding the correction amount set based on the value of the property parameter stored in the memory, to the original gradation signal;

a drive signal impressing circuit for generating a drive signal consisting of an analog signal based on the value of the corrected gradation signal after the corrected gradation signal is input and impressing the drive signal on one end of the signal line;

wherein, the original gradation signal generated by the image data conversion circuit has a value that corresponds to the gradation value of the image data, and the maximum value of the original gradation signal is set to a value equal to or smaller than a value that is acquired by subtracting a value corresponding to the correction amount set in the signal correction circuit from the maximum value in the input range of the drive signal impressing circuit.

The present invention provides a pixel drive device and a light emitting device that can correct an image data composed of supplied digital signals, based on property parameters of a pixel.

The present invention provides a pixel driving device and a light emitting device in a pixel driving device that can improve the deterioration of the image quality.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A detailed description will be given hereafter regarding a pixel driving device, light emitting device, and property parameter acquisition method in a pixel driving device according to the present invention with reference to embodiments shown in drawings. In addition, the light emitting device is described as a display device in the present embodiments.

Figure 1:
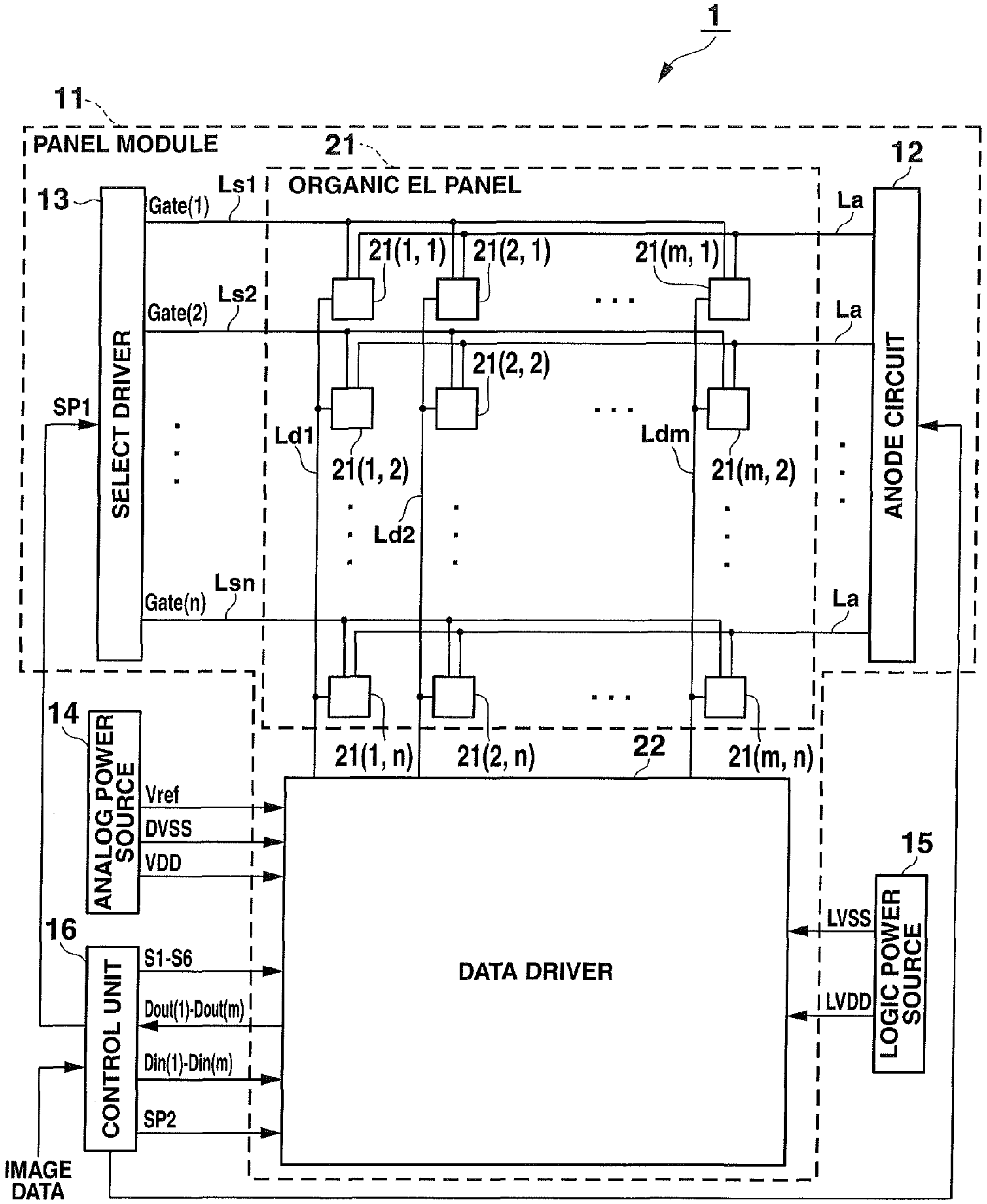
FIG. 1 is a block diagram showing a constitution of a display device according to an embodiment of the present invention.

FIG. 1 shows a constitution of a display device according to the present embodiment.

The display device (light emitting device) 1 according to the present embodiment is composed of a panel module 11, an analog power source (voltage impressing circuit) 14, a logic power source 15, and a control unit (including a parameter acquisition circuit and a signal correction circuit) 16.

The panel module 11 provides an organic EL panel (pixel array) 21, a data driver (a signal line driving circuit) 22, an anode circuit (power driving circuit) 12, and a select driver (select driving circuit) 13.

The organic EL panel 21 provides a plurality of data lines (signal lines) Ldi (i=1~m) arranged in the row direction, a plurality of select lines (scan lines) Lsj (j=1~n) arranged in the column direction, a plurality of anode lines La arranged in the column direction, and a plurality of pixels 21(i,j) (i=1~m, j=1~n, m, n; a natural number). Pixels 21(i,j) are arrayed in the vicinity of the intersecting point of data line Ldi and select line Lsj, and are connected with these lines respectively.

Figure 2:
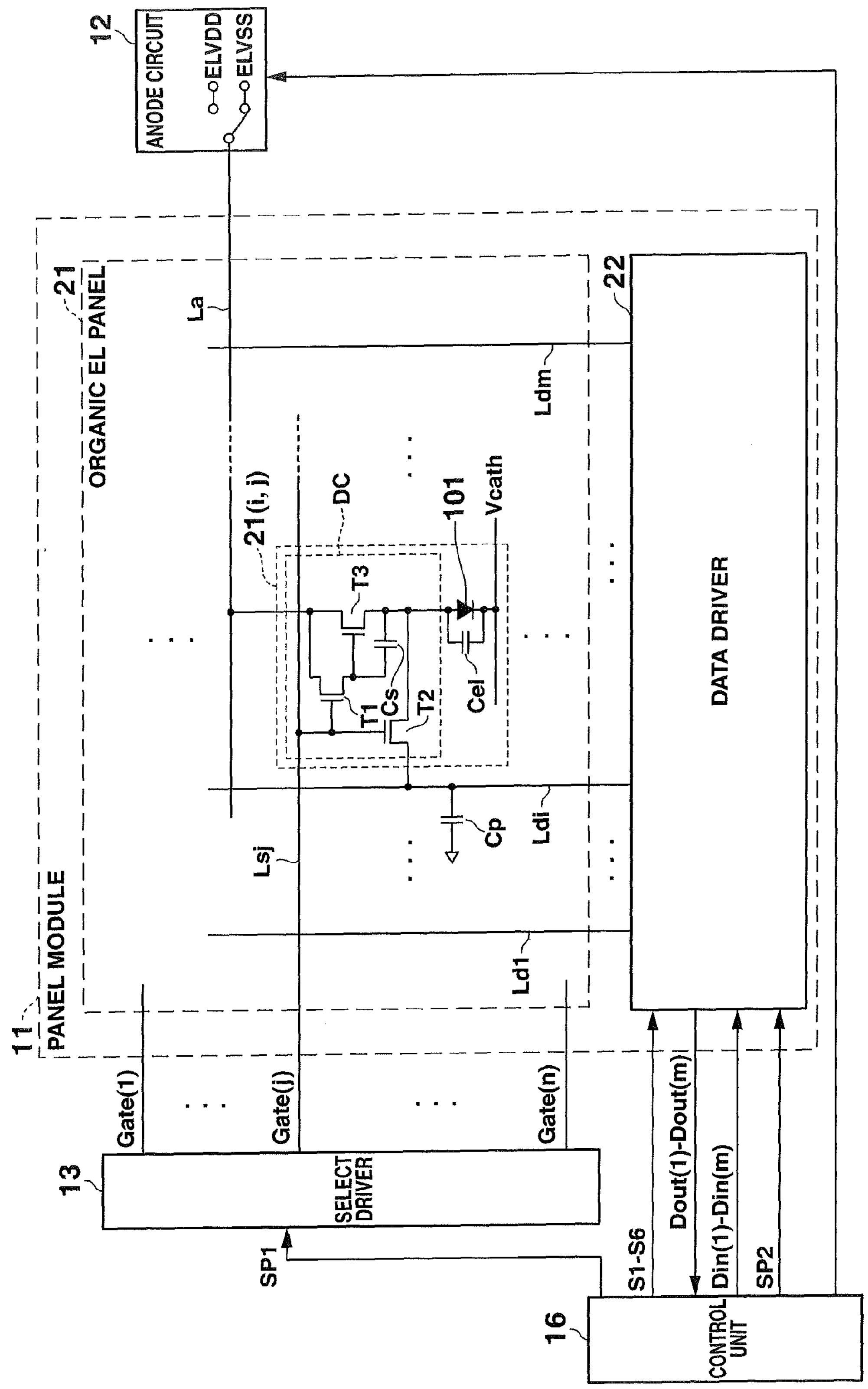
FIG. 2 is a drawing showing a constitution of an organic EL panel and a data driver shown in FIG. 1.

FIG. 2 shows specifics of the constitution of panel module 11 shown in FIG. 1. Each pixel 21(i,j) shows image data of one pixel of the image, and as shown in FIG. 2, which provides an organic EL element (light emitting element) 101, and a pixel drive circuit DC consisting of transistors T1 through T3 and a holding capacity Cs.

The organic EL element 101 is a self light-emitting type display element that uses a phenomenon of emitting light via excitons produced by a recombination of electrons that are injected into an organic compound and holes. Light is emitted with luminance determined by the current value of the supplied current to the organic EL element 101.

A pixel electrode is formed on the organic EL element 101, and an hole injection layer, a light emitting layer, and a counter electrode are formed in order on the pixel electrode. The hole injection layer has the function of supplying the holes to the light emitting layer.

The pixel electrode is composed of transparent or translucent conductive materials, for example, ITO (indium Tin Oxide), ZnO (Zinc Oxide) or the like. Each pixel electrode is insulated by an interlayer insulator from the pixel electrodes of other adjacent pixels.

The hole injection layer is composed of organic polymer materials that are transportable (hole injection/transport material). Further, for example, an aqueous PEDOT/PSS dispersion liquid, in which a conductive polymer, polyethylenedioxy thiophene (PEDOT), and a dopant, polystyrene sulfonate (PSS), are dispersed in an aqueous medium, is used as an organic compound solution containing electron hole injection/transport material of an organic polymer.

The light emitting layer is formed, for example, on the interlayer. The pixel electrode and the counter electrode are an anode electrode and a cathode electrode respectively. The light emitting layer has a function of emitting light with impressing a predetermined voltage between the anode electrode and the cathode electrode.

The light emitting layer is formed by a light emitting material that emits light of e.g. red (R), green (G) and blue (B), including conjugated double bond polymer, such as, of polyparaphenylenevinylene group or fluorine group, which are publicly known light emitting polymer material that can emit fluorescence or phosphorescence.

Further, the light emitting layer is formed by applying a solution(or dispersion liquid) in which the light emitting materials described above are dissolved (or dispersed) in an appropriate aqueous solvent or an organic solvent such as tetralin, tetramethylbenzene, mesitylene, xylene, on the interlayer by a nozzle coating method, ink jet method, or the like, and then volatilizing the solvent.

When the light emitting layer is composed of light emitting materials of the three primary colors of red (R), green (G), and blue (B), each of the light emitting material is generally applied to every column The counter electrode is a two-layer structure composed of conductive materials, for example, a layer consisting of a low work function material such as Ca, Ba, and the like and a light-reflective conductive layer such as Al.

Current flows from the pixel electrode to the counter electrode, i.e. from the anode electrode to cathode electrode, and does not flow in the reverse direction. Cathode voltage Vcath is impressed on the cathode electrode. In the present embodiment, the cathode voltage Vcath is set to GND (ground potential).

The organic EL element 101 has an organic EL pixel capacity (light emitter capacity) Ce1. The organic EL pixel capacity Ce1 is connected between the cathode and anode of the organic EL element 101 on the equivalent circuit.

Select driver 13 is for outputting a Gate (j) signal to each select line Lsj and selecting pixels 21(i,j) (j=1~n) in every column. The select driver 13 provides, for example, a shift register, and with this shift register, shifts the start pulse SP1 supplied from the control unit 16 successively as shown in FIG. 2 in accordance with a supplied clock signal. The select driver 13 outputs, as a Gate(1)~Gate(n) signal, a Hi (High) level signal (VgH) or a Lo (Low) level signal (VgL) regarding the start pulse SP1 that is successively shifted.

Data driver 22 has a composition for measuring the voltage of each data line Ldi (i=1~m) and acquiring the measured voltage Vmeas(t) at the time t, and a composition for impressing a voltage signal having the voltage value Vdata that is corrected based on the measured voltages Vmeas(t) on each data line Ldi.

Anode circuit 12 impresses voltage on the organic EL panel 21 via each anode line La. The anode circuit 12 is controlled by the control unit 16 as shown in FIG. 2, and thus, the voltage for impressing on the anode line La is switched to the voltage ELVDD or ELVSS.

Voltage ELVDD is the display voltage that is impressed on the anode line La when the organic EL element 101 of each pixel 21(i,j) emits light. The voltage ELVDD is voltage having positive potential higher than the ground potential in the present embodiment.

Voltage ELVSS is voltage that is impressed on the anode line La when the pixel drive circuit DC is set to the writing state described later and the Auto-zero method described later is performed. The voltage ELVSS is set to the same voltage as the cathode voltage Vcath of the organic EL element 101 in the present embodiment.

In each pixel 21(i,j), transistors T1 through T3 of the pixel drive circuit DC are TFT that are composed of n-channel type FET (Field Effect Transistor), and for example, are composed of amorphous silicon or polysilicon TFT.

The transistor T3 is a drive transistor (first thin film transistor) and a current control thin film transistor for supplying current to the organic EL element 101 by controlling amperage based on the gate to source voltage Vgs (referred to as gate voltage Vgs hereafter).

The drain (terminal) is connected to the anode line La, and the source (terminal) is connected to the anode (electrode) of the organic EL element 101 while the drain-to-source is the current path and the gate is the control terminal for the transistor T3.

Transistor T1 is a switch transistor (the second thin film transistor) in order to connect the transistor T3 to the diode when the writing described hereafter is performed.

The drain of the transistor T1 is connected to the drain of the transistor T3, and the source of the transistor T1 is connected to the gate of the transistor T3.

The gate (terminal) of the transistor T1 of each pixel 21(1, j)~21(m,j) is connected to the select line Lsj (j=1~n).

For pixel 21(1, 1), when a high level Gate(1) signal VgH is output to the select line Ls1 as the Gate(1) signal from the select driver 13, the transistor T1 becomes an ON state.

When a low level Gate(1) signal VgL is output to the select line Ls1 as the Gate(1) signal from the select driver 13, the transistor T1 becomes an OFF state.

Transistor 2 is a switch transistor (the third thin film transistor) in order to conduct or interrupt between the anode circuit 12 and the data driver 22. The transistor T2 is in the ON or OFF state according to the selection by the select driver 13. The ON or OFF state determines the conduct or interrupt mode between the anode circuit 12 and the data driver 22. Circumstances are also the same for other pixels 21(i,j).

The drain of the transistor T2 of each pixel 21(i,j) is connected to the anode (electrode) of the organic EL element 101 as well as to the source of the transistor T3.

The gate of the transistor T2 of each pixel 21(1,j)~21(m,j) is connected to the select line Lsj (j=1~n).

Further, the source of the transistor T2 of each pixel 21(i, 1)~21(i,n) is connected to the data line Ldi (i=1~m).

For the pixel 21(1,1), the transistor T2 becomes an ON state when a high level Gate(1) signal (VgH) is output as the Gate(1) signal to the select line Ls1, thereby connecting the data line Ld1 and the anode of the organic EL element 101 as well as source of the transistor T3.

When a Lo-level signal (VgL) is output to the select line Ls1 as the Gate(1) signal, the transistor T2 becomes an OFF state and interrupts the connection between the data line Ld1 and anode line of the organic EL element 101 as well as the source of the transistor T3. Circumstances are also the same for other pixels 21(i,j).

Holding capacity Cs is the capacity for holding the gate voltage Vgs of transistor T3, and is connected, by its one terminal, to the source of transistor T1 and the gate of transistor T3, and, by its another terminal, to the source of transistor T3 and the anode of the organic EL element 101.

In transistor T3, the source and drain of transistor T1 are connected to the gate and the drain thereof respectively. Transistor T1 and transistor T2 are in the ON state when the voltage ELVSS is impressed on the anode line La by the anode circuit 12, a Hi-level signal (VgH) is impressed on the select line Ls1 by the select driver 13 as the Gate(1) signal, and the voltage signal is impressed on the data line Ld1.

At that moment, transistor T3 is in a diode-connected state by connecting between the gate and the drain through transistor T1.

Further, when the voltage signal is impressed on the data line Ld1 by the data driver 22 at that time, the voltage signal is impressed on the source of transistor T3 via transistor T2, and thus, transistor T3 is in the ON state. Subsequently, current that is determined by the voltage signal flows towards the data line Ld1 from the anode circuit 12, via the anode line La, transistor T3, and transistor T2. Holding capacity Cs is charged by the gate voltage Vgs of the transistor T3 of such time, and the electric charge is stored in the holding capacity Cs.

When a Lo-level signal (VgL) is impressed on the select line Ls1 by the select driver 13 as the Gate(1) signal, transistors T1 and T2 become an OFF state. At that time, the holding capacity Cs holds the gate voltage Vgs of transistor T3. Circumstances are also the same for other pixels 21(i,j).

In addition, there also exists a wire parasitic capacity Cp within the organic EL panel 21. The wire parasitic capacity Cp is mainly produced at the intersecting point of data line Ld1~Ldm and the select line Ls1~Lsn.

A display device 1 according to the present embodiment measures the data line voltage a plurality of times as the property value of the pixel drive circuit DC of each pixel 21(i,j) using the Auto-zero method. With this measurement, the threshold voltage Vth of transistor T3 of each pixel 21(i,j) and the irregularity of the current amplification factor β in the pixel drive circuit DC can be acquired as correction parameters of image data in the common circuit.

Figure 3A:
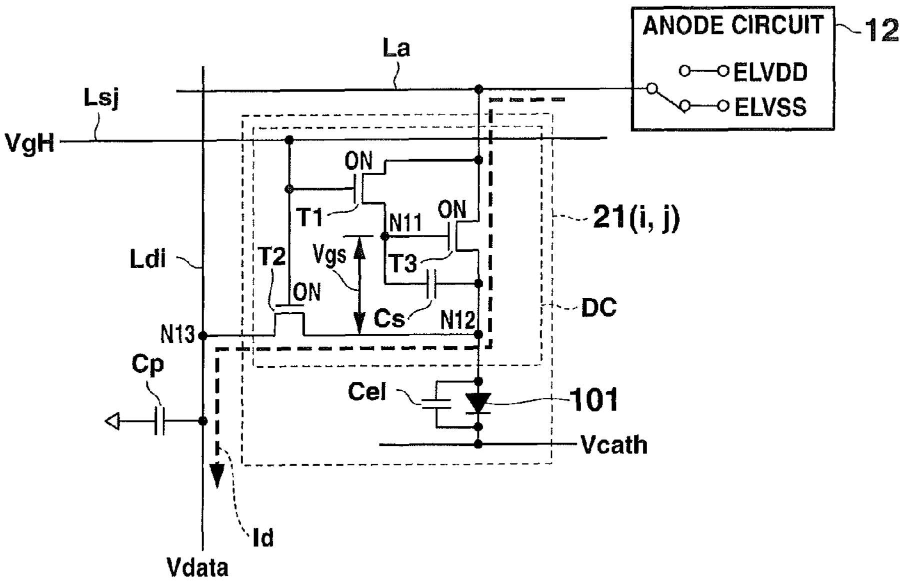
FIGS. 3A and B are a diagram and a graph to explain voltage/current properties at the time of pixel drive circuit writing.
Figure 3B:
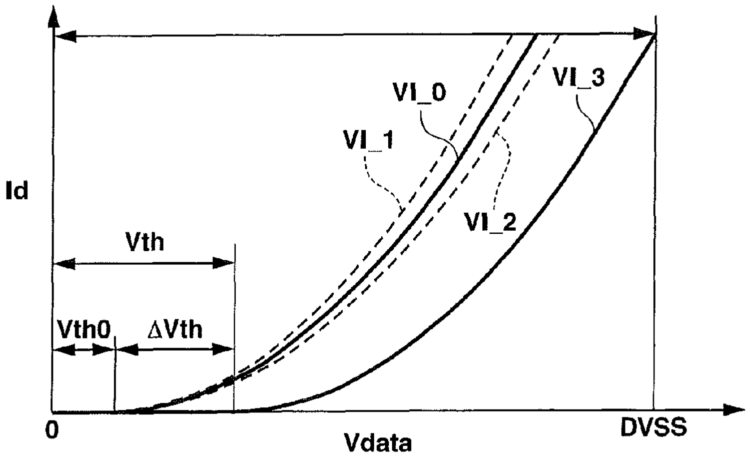

FIG. 3A is a diagram and FIG. 3B is a graph to explain voltage/current properties at the time of image data writing of the pixel drive circuit. Here, FIG. 3A is a diagram showing the voltage and current of each component of pixel 21(i,j) at the time of writing.

As shown in FIG. 3A, a Hi-level signal (VgH) is impressed on the select line Lsj by the select driver 13 at the time of writing. Then, transistors T1 and T2 become an ON state, and transistor 3, which is a current control thin film transistor, is diode-connected.

Subsequently, a voltage signal of the voltage value Vdata determined by the image data is impressed on the data line Ldi by the data driver 22. At that time, the voltage ELVSS is impressed on the anode line La by the anode circuit 12.

Current Id determined by the voltage signal then flows towards the data line Ldi via the pixel drive circuit DC from the anode circuit 12 through transistors T2 and T3.

The current value of this current Id is expressed with the following equation (101). β in the equation (101) is the current amplification factor, and Vth is the threshold voltage of transistor T3.

Voltage Vds that is impressed between the source to the drain of transistor 3 is the voltage in which the drain-to-source voltage of transistor T2 (voltage between connection N13 and connection N12) is subtracted from the absolute value of voltage Vdata when the voltage ELVSS of the anode line La is regarded as 0V.

In other words, the equation (101) not only expresses the voltage/current properties of transistor T3 but also expresses the properties when the pixel drive circuit DC substantially functions as one element, and β is an effective current amplification factor of the pixel drive circuit DC.

$$Id=\beta(|V\text{data}|-Vth)^2 \tag{101}$$

FIG. 3B is a graph showing a change in the current Id to the absolute value of the voltage Vdata.

Transistor T3 has the properties of the initial state, and such properties are expressed with the voltage/current properties VI_0 shown in FIG. 3B when the threshold voltage Vth has the initial value Vth0 and the current amplification factor β of the pixel drive circuit DC has the initial value β0 (reference value).

Here, β0 the reference value of β is set to, for example, a typical value or a design value of the pixel drive circuit DC.

When the transistor T3 deteriorates over time and the threshold voltage Vth shifts (increases) just ΔVth, the voltage/current properties become the voltage/current properties VI_3 shown in FIG. 3B.

When the value of the current amplification factor β is β1 (=β0−Δβ) that is smaller than β0 due to irregularities from β0 (reference value), the voltage/current properties become voltage/current properties VI_1, and when the value of the current amplification factor β is β2 (=β0+Δβ) that is larger than β0, the voltage/current properties become voltage/current properties VI_2.

Next, a description regarding the auto-zero method will be given.

In the auto-zero method, first, a reference voltage Vref is impressed on the gate-to-source of the pixel drive circuit DC transistor T3 of the pixel 21(i,j) via the data line Ldi during the writing described above. The reference voltage is set to the voltage in which the absolute value of the electric potential difference to the voltage ELVSS of anode line La exceeds the threshold voltage Vth. Thereafter, the data line Ldi is in a state of high impedance. By so doing, the voltage of gate data line Ldi is naturally lowered (decreased). After completing the natural lowering, the voltage of data line Ldi is measured and the measured voltage is regarded as the threshold voltage Vth.

As compared with the general auto-zero method above described, the auto-zero method according to the present embodiment measures the voltage of data line Ldi at the timing just prior to completely finishing the natural lowering described above. A detailed explanation will be given hereafter.

Figure 4A:
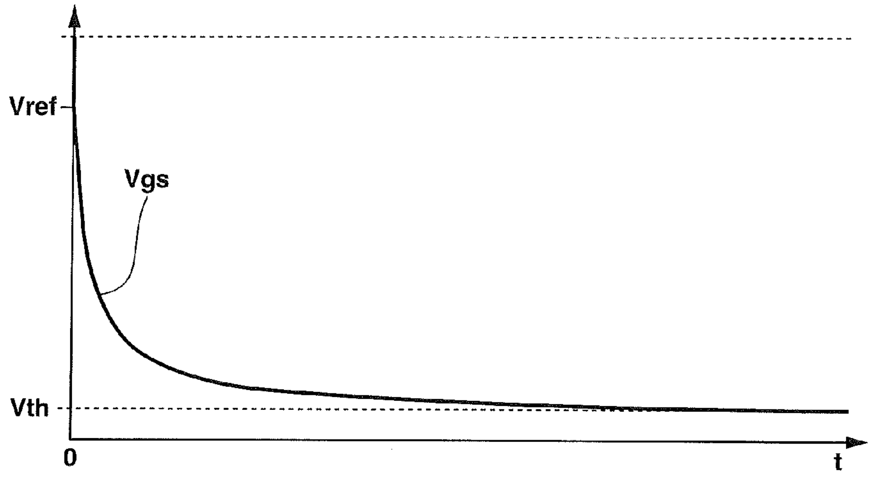
FIGS. 4A and B are graphs to explain a voltage measurement method of the data line when the Auto-zero method is used according to the present embodiment.

FIGS. 4A and B are graphs to explain a voltage measurement method of a data line when using the auto-zero method according the present embodiment. FIG. 4A is a graph showing a time variation (settling properties) of data line Ldi when the data line Ldi is in a high impedance state after the reference voltage Vref described above is impressed on it.

The voltage for data line Ldi is acquired by the data driver 22 as the measured voltage Vmeas(t). The measured voltage Vmeas(t) is generally voltage that is equal to the gate voltage Vgs of transistor T3.

Figure 4B:
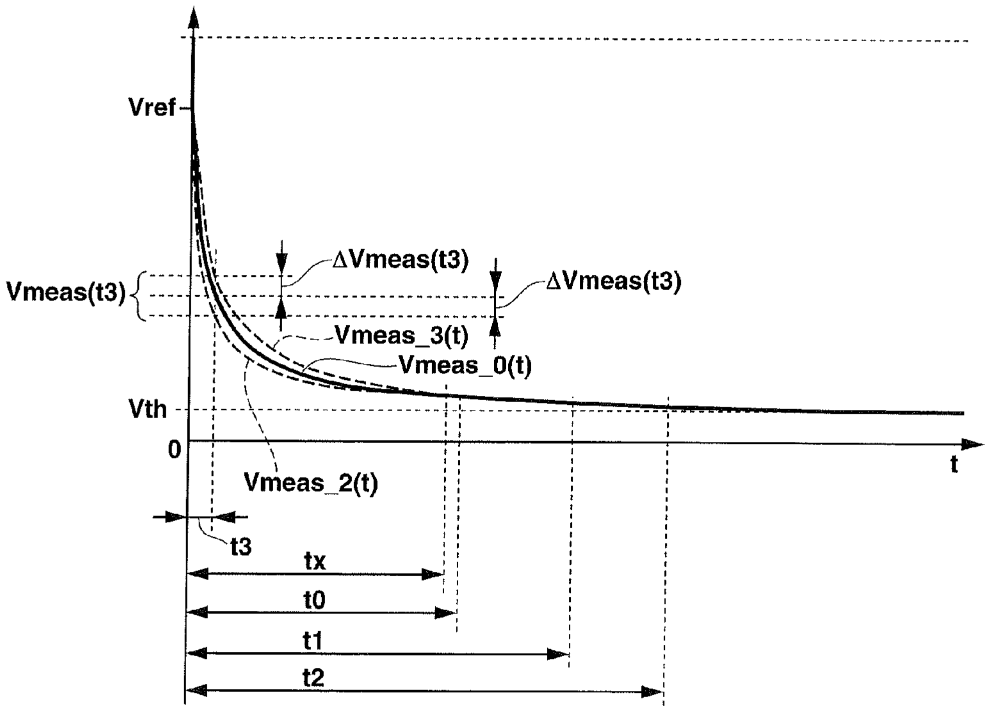

FIG. 4B is a graph to explain the influence on the data line voltage (measured voltage Vmeas(t)) when there are β irregularities shown in FIG. 3B. In addition, the vertical axes in FIG. 4A and FIG. 4B show the absolute value of data line Ldi voltage (measured voltage Vmeas(t)). The horizontal axes indicate the elasped time t (settling time) from the time when data line Ldi becomes a high impedance state by impressing reference voltage Vref on it and then stopping the impressing of the reference voltage Vref.

A more detailed description regarding measurement of data line voltage with the auto-zero method will be given.

In the writing state, first, the absolute value of the electric potential difference with respect to the voltage ELVSS of anode line LA exceeds the threshold voltage Vth of transistor T3, and a reference voltage Vref with negative polarity having a lower electric potential than the voltage ELVSS is impressed on the gate-to-source of the pixel drive circuit DC transistor T3 of the pixel 21(i,j) via the data line Ldi. By so doing, current determined by the reference voltage Vref flows towards the data line Ldi from the anode circuit 12 via anode line La, transistor T3, and transistor T2.

At this time, holding capacity Cs connected to the gate-to-source of transistor T3 (between the connection points N11 and N12 in FIG. 3A) is charged to the voltage based on the reference voltage Vref.

Next, the data input side (data driver 22 side) of data line Ldi is set in a high impedance (HZ) state Immediately after establishing a high impedance state, the voltage charged in the holding capacity Cs is held at the voltage based on the reference voltage Vref, and the gate-to-source voltage of transistor T3 is held at the voltage charged in the holding capacity Cs.

By so doing, immediately after establishing a high impedance state, transistor T3 maintains the ON state and current keeps flowing to the drain-to-source of transistor T3.

Thereby, electric potential of the source terminal side (connection point N12) of transistor T3 gradually increases over the course of time approaching the electric potential of the drain terminal side. Therefore, the value of the current that flows between the drain-to-source of transistor T3 is decreasing.

In conjunction with this, a part of electrical charge stored in the holding capacity Cs gets discharged. When electrical charge stored in the holding capacity Cs is discharged gradually, voltage between both ends of the holding capacity Cs decreases gradually.

In this manner, the gate voltage Vgs of transistor T3 gradually decreases. Therefore, the absolute value of the voltage of data line Ldi also gradually decreases as shown in FIG. 4A.

In the end, when there is no current flow between the drain-to-source of transistor T3, discharge from the holding capacity Cs stops. The gate voltage Vgs of transistor T3 at that time becomes the threshold voltage Vth of the transistor T3.

Because there is no current flow between the drain-to-source of transistor T2 at that time, the voltage between the drain-to-source of transistor T2 is nearly zero. As a result, the voltage of data line Ldi becomes nearly equal to the threshold voltage Vth of transistor T3.

As shown in FIG. 4A, the voltage of data line Ldi asymtotically approaches the threshold voltage Vth over time (settling time). However, even though this voltage approaches to the threshold voltage Vth without time limit, theoretically, it will not become perfectly equal to the threshold voltage Vth no matter long the settling time is set.

Thereby, in the present embodiment, control unit 16 in the display device 1 is set to a high impedance state and the settling time t for measuring voltage of data line Ldi is set in advance. And then, the voltage (measured voltage Vmeas(t)) of data line Ldi is measured at the set settling time t, and thus, current amplification factor β of pixel drive circuit DC and the threshold voltage Vth of transistor T3 are acquired based on the measured voltage Vmeas(t).

The relationship with settling time t of the measured voltage Vmeas(t) can be expressed with the following equation (102).

$$Vmeas(t) = Vth + \frac{1}{\frac{1}{(C/\beta)} + \frac{1}{Vref - Vth}} \tag{102}$$

wherein, C=Cp+Cs+Cel.

When the settling time t is set to a value that satisfies the condition (C/β)/t<1 (in other words, (C/β)<t), the measured voltage Vmeas(t) at the set settling time t can be expressed with the following equation (103).

$$Vmeas(t) \approx Vth + \frac{(C/\beta)}{t} \tag{103}$$

When the settling time tx shown in FIG. 4B is the time to satisfy the condition (C/β)/t=1, a time that exceeds this settling time tx becomes the settling time to satisfy the condition (C/β)/t<1. This settling time tx is a time in which the measured voltage Vmeas(t) is generally approximately 30% of the reference voltage Vref, and more specifically, generally between 1 ms and 4 ms.

Next, Vmeas_0(t) indicated by a solid line in FIG. 4B shows the settling properties of voltage for data line Ldi when the current amplification factor β is the initial value β0 (reference value) (same as the condition of β for the voltage/current properties VI_0 shown in FIG. 3B).

Vmeas_2(t) shown in FIG. 4B shows the settling property of voltage for data line Ldi when the value of the current amplification factor β is β1(=β0−Δβ) which is smaller than β0 (same as the condition of β of the voltage/current properties VI_1 shown in FIG. 3B). Vmeas_3(t) shows the settling property of voltage for data line Ldi when the value of the current amplification factor β is β2(=β0+Δβ) which is larger than β0 (same as the condition of β of the voltage/current properties VI_2 shown in FIG. 3B).

In the early stage, such as time of shipment, of the display device 1, two different times t1 and t2 that exceed the settling time tx are set as the settling time to satisfy the condition above (C/β)/t<1. Subsequently, voltage of data line Ldi is measured twice with the timing of the settling times t1, t2 after impressing the reference voltage Vref on data line Ldi according to the Auto-zero method described above. The initial threshold voltage Vth, that is Vth0 and (C/β), can be derived based on the above equation (103) the voltage value of the data line Ldi obtained by the measurement for the settling times t1, t2.

Thereafter, the threshold voltage Vth0 and (C/β) for each of all pixels 21(i,j) in the organic EL panel 21 are derived by the method described above. Then, the mean value (<C/β>) of (C/β) of each pixel 21 and the irregularity thereof is calculated.

Further, the shortest settling time t0, which satisfies (C/β)/(βt)<1 while irregularity is within the allowable precision of threshold voltage Vth measurement, is determined.

When image data is supplied in operation, the threshold voltage Vth in operation can be derived from the following equation (104) modified from equation (103), using the measured voltage Vmeas(t0) acquired.

The arithmetic mean value of (C/β) of each pixel 21 can be used as the mean value (<C/β>) of (C/β) of each pixel 21; however, the median value of (C/β) of each pixel 21 may also be used.

$$Vth = Vmeas(t0) - \frac{<C/\beta>}{t0} \tag{104}$$

Here, the value of the second part of the right side of the equation in the above equation (104) is defined as offset voltage Voffset.

$$Voffset = \frac{<C/\beta>}{t0} \tag{105}$$

A description will be given hereafter regarding the case where the current amplification factor β of the pixel drive circuit DC of pixel 21(i,j) is irregular within the range of Δβ around β0 as shown in β0±Δβ=β0 (1±Δβ/β0).

The amount of change ΔVmeas(t) due to Δβ in the voltage (measured voltage Vmeas(t)) of data line Ldi at that time can be expressed with the following equation (106).

$$\Delta Vmeas(t) = -\left[\frac{\Delta\beta}{\beta}\right] \times \frac{<C/\beta>}{t}\left\{1 - \frac{2}{Vref - Vth}\frac{<C/\beta>}{t}\right\} \tag{106}$$

(Δβ/β) is an irregularity parameter that shows irregularity in current properties for the pixel drive circuit DC of each pixel 21(i,j), and ΔVmeas(t) indicates the dependence of the voltage of data line Ldi on the irregularity Δβ (or the irregularity parameter (Δβ/β)). In other words, as shown in equation (106), the voltage of data line Ldi fluctuates only ΔVmeas(t) due to the irregularity of β.

The settling time t at that time can be set to the value t3 that is smaller compared to the settling time tx as shown in FIG. ((C/β)/t≧1, t=t3)

At this settling time t3, the voltage of data line Ldi rapidly settles (lowers) as shown in FIG. 4B. Therefore, the dependence of the voltage (measured voltage Vmeas(t)) of data line Ldi on the irregularity of β is comparatively larger.

For this reason, when Δmeas(t) is measured at the settling time t3, Δmeas(t) can be acquired as a larger value compared to when measured at settling time t1 or t2, and it is easy to distinguish the change of measured voltage Vmeas(t) to the irregularity of Δβ. These are the reasons why Vmeas(t) is acquired by the settling time t3. ΔVmeas(t) is derived from this Vmeas(t), and (Δβ/β) can be acquired from the equation (106).

A description will be given hereafter regarding the correction for voltage value Vdata of a voltage signal impressed on a data line Ldi based on supplied image data. An object of this correction is to reduce the affect on a display image due to a change in threshold and irregularity of the current amplification factor β.

The voltage value Vdata1 in which the voltage value Vata0 is corrected based on the irregularity parameter (Δβ/β) of current properties of the pixel drive circuit DC of each pixel 21(i,j) while the voltage before correction is regarded as Vdata0 based on image data, is expressed by the following equation (107) that is derived by differentiating the equation (106) by the voltage.

$$Vdata1 = Vdata0 \times \left\{1 - \frac{1}{2}\left(\frac{\Delta\beta}{\beta}\right)\right\} \tag{107}$$

Threshold voltage Vth is expressed with the following equation (108) according to the Auto-zero method for the settling time t0 by using the offset voltage Voffset defined in the equation (105).

$$Vth = Vmeas(t0) - Voffset \tag{108}$$

The voltage value (corrected voltage) Vdata, in which the voltage value Vdata0 based on image data is corrected based on the irregularity parameter (Δβ/β) of current properties of the pixel drive circuit DC and the threshold voltage Vth, is expressed with the following equation (109).

This voltage value Vdata is the voltage value of the voltage signal (drive signal) that is impressed on data line Ld1 by data driver 22.

$$Vdata = Vdata1 + Vth \tag{109}$$

A detailed description will be given hereafter regarding the composition of the data driver 22.

Figure 5:
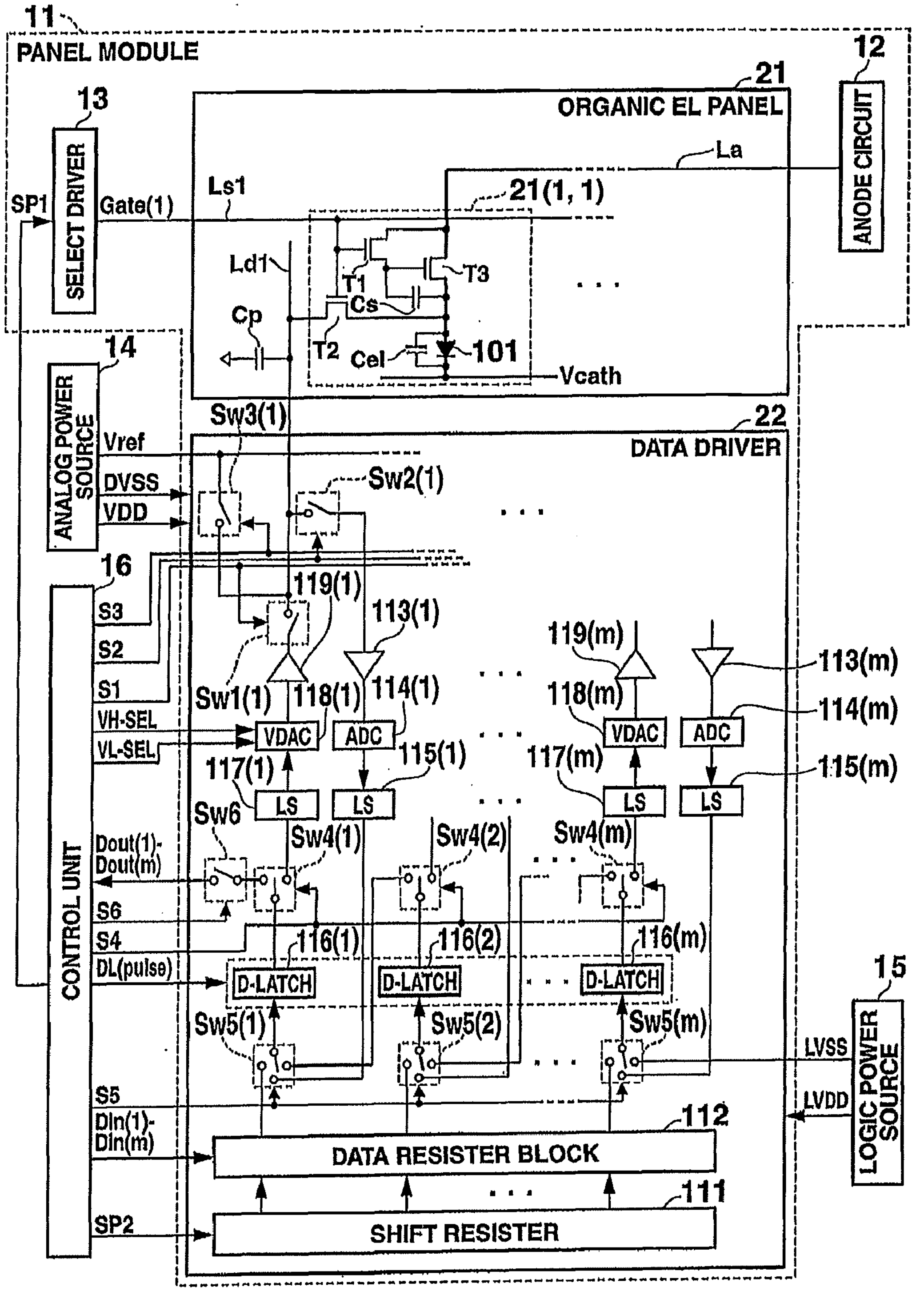
FIG. 5 is a block diagram showing a detailed constitution of the data driver shown in FIG. 1.

FIG. 5 shows a block diagram showing a detailed constitution of the data driver 22 shown in FIG. 1.

The data driver 22 provides, as shown in FIG. 5, a shift register 111, a data register block 112, buffers 113(1) through (m), 119(1) through 119(m), ADCs 114(1) through 114(m), level shift circuits (described as "LS" in the drawing) 115(1) through 115(m), 117(1) through 117(m), data latch circuits (described as "D-Latch" in the drawing) 116(1) through 116 (m), VDACs 118(1) through 118(m), and switches Sw1(1) through Sw1(m), Sw2(1) through Sw2(m), Sw3(1) through Sw3(m), Sw4(1) through Sw4(m), Sw5(1) through Sw5(m), and Sw6.

Sw3(1) through Sw3(m) correspond to a switching circuit.

The shift register 111 generates a shift signal by shifting start pulse SP2 supplied from control unit 16 sequentially by a clock signal, and supplies these shift signals sequentially into the data register block 112.

The data register block 112 is composed of m pieces of registers. Digital data Din(i) (i=1~m) generated based on image data is supplied into the data register block 112 from the control unit 16. The data register block 112 sequentially holds these digital data Din(i) (i=1~m) in each of the above m registers according to the shift signal supplied from the shift register 111.

Buffer 113(i) (i=1~m) is a buffer circuit in order to impress voltage of data line Ldi (i=1~m) on ADC 114(i) (i=1~m) respectively as analog data.

ADC114(i) (i=1~m) is an analog-to-digital converter to convert analog voltage to a digital signal. ADC 114(i) converts analog data that is impressed by the buffer 113(i) into a digital data output signal Dout(i). ADC 114(i) is used as a measuring instrument (voltage measuring circuit) to measure the voltage of data line Ldi (i=1~m).

Level shift circuit 115(i) level-shifts digital data that ADC 114(i) generated through conversion so as to conform to the power supply voltage of a circuit (i=1~m).

Digital data Din(i) is held in each register of data register blocks 112. Data latch circuit 116(i) holds digital data Din(i) supplied from each register of data register blocks 112. The data latch circuit 116(i) latches and holds digital data Din(i) at the timing that data latch pulse DL(pulse) supplied from the control unit 16 rises.

Level shift circuit 117(i) level-shifts digital data Din(i) held by data latch circuit 106(i) so as to conform to the power supply voltage of a circuit (i=1~m).

VDAC 118(i) (i=1~m) is a digital-to-analog converter to convert digital signals to analog voltage. The VDAC 118(i) converts digital data Din(i) that was level-shifted by the level shift circuit 117(i) to an analog voltage and outputs to data line Ldi via buffer 119(i) (i=1~m). The VDAC 118(i) is equivalent to a drive signal impressing circuit that generates drive signals and impresses them on a succeeding circuit.

Buffer 119(i) is a buffer circuit in order to output an analog voltage, that is output from the VDAC 118(i), to data line Ldi (i=1~m).

Figure 6B:
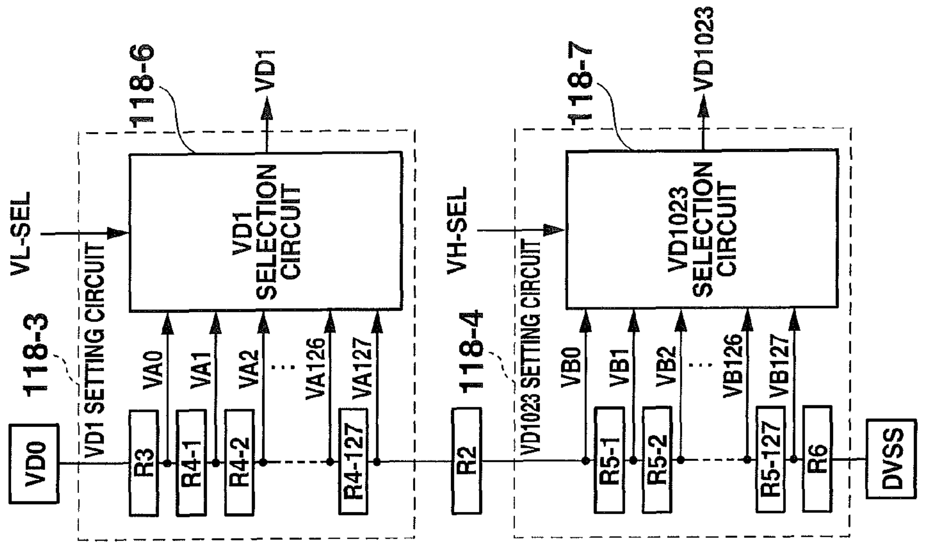
FIGS. 6A and B are diagrams to explain the constitution and a function of DVAC and ADC shown in FIG. 5.
Figure 6A:
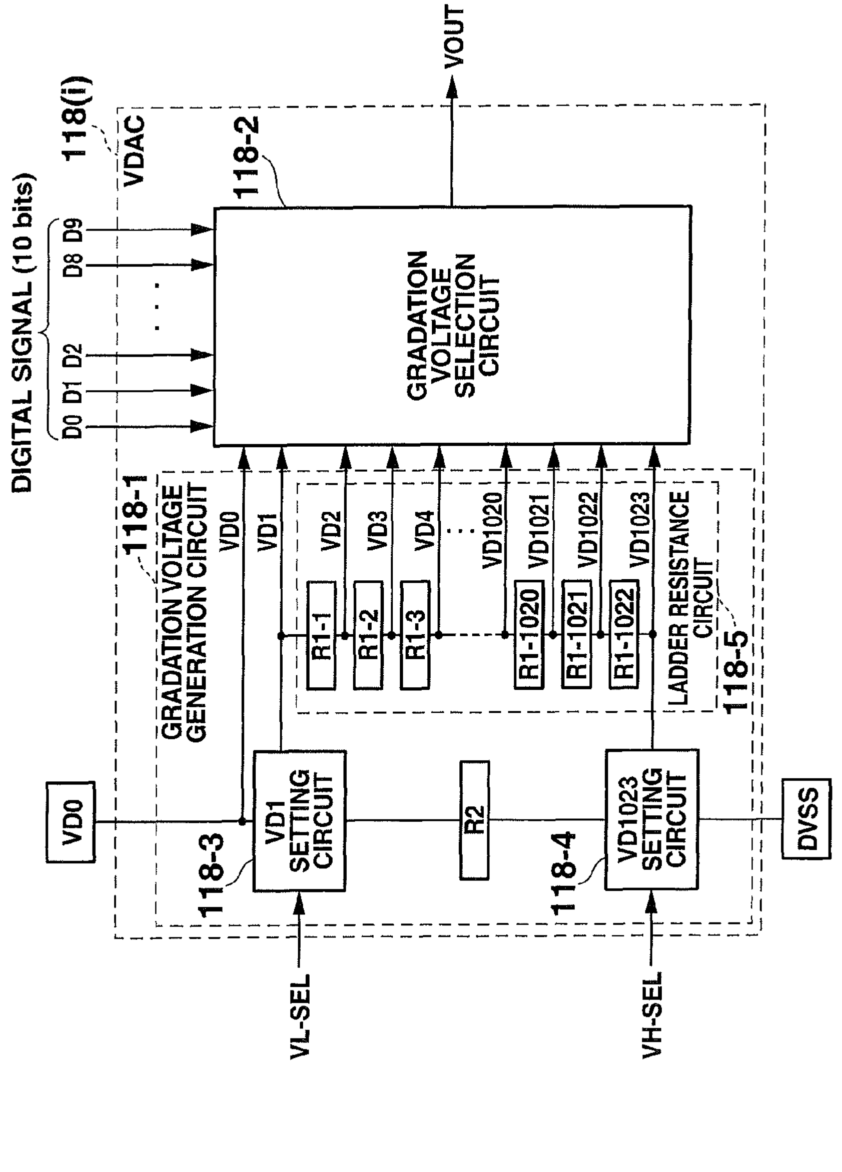

FIGS. 6A and B are diagrams to explain the constitution and a function of VDAC 118 shown in FIG. 5.

FIG. 6A shows a general constitution of the VDAC 118, and FIG. 6B shows a constitution of a VD1 setting circuit 118-3 and VD1023 setting circuit 118-4 that are included in VDAC118.

As shown in FIG. 6A, the VDAC 118(i) has a gradation voltage generating circuit 118-1 and a gradation voltage selection circuit 118-2.

The gradation voltage generating circuit 118-1 generates a predetermined number of gradation voltages (analog voltage) that are determined by the number of digital signal bits input into the VDAC 118. As shown in FIG. 6A, for example, when a digital signal to be input is 10 bits (D0-D9), the gradation voltage generating circuit 118-1 generates 1024 gradation voltages VD0 through VD1023.

The gradation voltage generating circuit 118-1 has a VD1 setting circuit 118-3, a VD1023 setting circuit 118-4, a resistance R2, and a ladder resistance circuit 118-5.

The VD1 setting circuit 118-3 is a circuit to set a voltage value of gradation voltage VD1 based on the control signal VL-SEL that is supplied from the control unit 16 and voltage VD0 to be impressed. The voltage VD0 is the minimum gradation voltage, and set, for example, to the same voltage as the power source voltage ELVSS.

The VD1 setting circuit 118-3 has resistances R3, R4-1 through R4-127 and a VD1 selection circuit 118-6 as shown in FIG. 6B.

The resistances R3, R4-1 through R4-127 are voltage-dividing resistances that are series-connected in this order. Voltage VD0 is impressed on the end of the resistance R3 side of the series-connected resistances. The end of the resistance R4-127 side of the series-connected resistances is connected to one end of the resistance R2. Voltage at the connection point of resistance R3 and resistance R4-1 is the voltage VA0, voltage at the connection point of resistance 4-i and resistance 4-i+1 is the voltage VAi (i=1~126), voltage at the connection point of resistance R4-127 and resistance R2 is voltage VA127.

VD1 selection circuit 118-6 selects either voltage within the voltage VA0 through VA127 based on the control signal VL-SEL supplied from the control unit 16, and outputs the selected voltage as the gradation voltage VD1. VD1 setting circuit 118-3 sets the gradation voltage VD1 to a value corresponding to the threshold voltage Vth0.

VD1023 setting circuit 118-4 is a circuit to set a voltage value of the maximum gradation voltage VD1023 based on control signal VH-SEL supplied from the control unit 16 and voltage DVSS impressed by analog power supply 14.

VD1023 setting circuit 118-4 has resistances R5-1 through R5-127, R6, and a VD1023 selection circuit 118-7 as shown in FIG. 6B.

The resistances R5-1 through R5-127, and R6 are voltage-dividing resistances that are series-connected in that order. The end of the resistance R5-1 side of the series-connected resistances is connected to the other end of the resistance R2, and voltage VDSS is impressed on the end of the resistance R6 side of the series-connected resistances. Voltage at the connection point of these resistances R2 and R5-1 is the voltage VB0, and voltage at the connection point of the resistances R5-i and R5-i+1 is the voltage VBi (i=1~126), and voltage at the connection point of the resistances R5-127 and R6 is the voltage VB127.

VD1023 selection circuit 118-7 selects either voltage within the voltage VB0 through VB127 based on the control signal VH-SEL supplied from the control unit 16, and outputs the selected voltage as gradation voltage VD1023.

Ladder resistance circuit 118-5 provides a plurality of ladder resistances, for example, R1-1 through R1-1022 that are series-connected. Each of the ladder resistances R1-1 through R1-1022 has the same resistance value.

The end of resistance R1-1 side of the ladder resistance circuit 118-5 is connected to the output terminal of the VD1 setting circuit 118-3 and the voltage VD1 is impressed on this terminal. The end of resistance R-1022 side of the ladder resistance circuit 118-5 is connected to the output terminal of the VD 1023 setting circuit 118-4, and the voltage VD1023 is impressed on this terminal.

The ladder resistances R1-1 through R1-1022 divides the voltage between VD1-to-VD1023 evenly. Ladder resistance circuit 118-5 outputs the evenly divided voltage into the gradation voltage selection circuit 118-2 as gradation voltage VD2~VD1022.

Digital signals level-shifted by the level shift circuit 117(i) are input to the gradation voltage selection circuit 118-2 as digital signals D0~D9. After that, the gradation voltage selection circuit 118-2 selects a voltage corresponding to the value of digital signals D0~D9 that is input from each of the gradation voltage VD0~VD1023 supplied from the gradation voltage generating circuit 118-1, and outputs the gradation voltage as the output voltage VOUT of the VDAC 118.

As described above, the VDAC 118(i) converts the input digital signal to an analog voltage corresponding to the gradation value of the digital signal.

In the present embodiment, the value of the digital signal input to the VDAC 118 is set within a range narrower than the total gradation range that is determined by the number of image data bits, and the voltage range of the output voltage VOUT that is output by the VDAC118(i) is set within a part of the total gradation voltage range VD0~VD1023 generated by the gradation voltage generating circuit 118-1.

In the present embodiment, as described above, the correction in order to reduce image data fluctuation due to the fluctuation of the threshold voltage Vth is performed on supplied image data based on the value of the threshold voltage Vth that is acquired at that time. By performing this correction, the width of the voltage range of the output voltage VOUT for all gradation values for image data does not change; however, the lower limit voltage value within the voltage range that is the first gradation for image data is shifted only the value which corresponds to the amount of change (ΔVth) in the threshold voltage Vth. Therefore, the voltage range of the output voltage VOUT for all gradation values for image data shifts within the range of all gradation voltages VD0~VD1023.

Here, every gradation voltage VD1~VD1023 set by the gradation voltage generating circuit 118-1 is set to a value at even intervals. Accordingly, even though the voltage range in the output voltage VOUT shifts, the change properties of output voltage of VDAC 118(i) corresponding to the gradation value for image data can be maintained uniformly.

When the gradation value for image data is zero, VDAC 118(i) outputs the minimum gradation voltage VD0 that corresponds to the zero gradation. Since the organic EL element

101 is in a state which does not emit light giving a black display at this time, there is no need for correction based on a value of the threshold voltage Vth. Therefore, the gradation voltage VD0 is set at a fixed voltage value.

Both ADC 114(i) and VDAC 118(i) have, for example, an identical bit width, and the voltage width, which corresponds to 1 gradation, is set to an identical value.

Switch Sw1(i) (i=1~m) is a switch to connect or disconnect between data line Ldi and the output terminal of buffer 119(i) respectively.

When a voltage signal having the voltage value Vdata is impressed on the data line Ldi, each switch Sw1(i) becomes an ON state (closed) after an On1 signal is supplied from the control unit 16 as a switch control signal S1, connecting the output terminal of buffer 119(i) and the data line Ldi.

After impressing a voltage signal of the voltage value Vdata on the data line Ldi is completed, each switch Sw1(i) becomes an OFF state (opened) when the Off1 signal is supplied from the control unit 16 as a switch control signal S1 interrupting the connection between the output terminal of buffer 119(i) and the data line Ldi.

Each switch Sw2(i) (i=1~m) is a switch to connect or disconnect between data line Ldi and the input terminal of buffer 119(i).

When voltage measurement for data line Ldi is performed with the Auto-zero method, each switch Sw2(i) becomes an ON state (closed) when the On2 signal is supplied from the control unit 16 as a switch control signal S2 connecting the input terminal of buffer 113(i) and the data line Ldi.

After the voltage measurement for the data line Ldi is completed, each switch Sw2(i) becomes an OFF state when an Off2 signal is supplied from the control unit 16 as a switch control signal S2, interrupting the connection between the output terminal of buffer 113(i) and the data line Ldi.

Each switch Sw3(i) is a switch to connect or disconnect between the data line Ldi and the output terminal of reference voltage Vref of analog power supply 14.

When the reference voltage Vref is impressed on the data line Ldi, each switch Sw3(i) becomes an ON state when the On3 signal is supplied from the control unit 16 as a switch control signal S3 connecting the output terminal of the reference voltage Vref of the analog power supply 14 and the data line Ldi.

The On3 signal is supplied to the switch Sw3(i) for only the short time required for impressing the reference voltage Vref in order to measure the voltage with the Auto-zero method described above. Subsequently, each switch Sw3(i) becomes an OFF state when the Off3 signal is supplied from the control unit 16 as a switch control signal S3 interrupting the connection between the output terminal of the reference voltage Vref of the analog power supply 14 and the data line Ldi.

Switch Sw4(1) is a switch for switching the connection between the output terminal of data latch circuit 116(1) and either one terminal of the switch Sw6 or the level shift circuit 117(1). This switch has a front terminal that is connected to one end of the switch Sw6 and the DAC side terminal connected to the level shift circuit 117(1).

Each switch Sw4(i) (i=2~m) is a switch for switching the connection between the output terminal of the data latch circuit 116(i) and either one terminal of switch Sw5(i−1) or the level shift circuit 117(i). This switch has a DAC side terminal that is connected to the level shift circuit 117(i) and a front terminal connected to one terminal of the switch Sw5(i−1).

When measurement voltage Vmeas(t) is output to the control unit 16 from the data driver 22 as the output signal Dout(1)~Dout(m), a Connect_front signal is supplied to each switch Sw4(i) (i=1~m) from the control unit 16 as the switch control signal S4.

The switch Sw4(i) (i=1~m) connects the output terminal of the data latch circuit 116(i) and the front terminal through the Connect_front signal supplied from the control unit 16.

When a voltage signal of the voltage value Vdata is impressed on each data line Ldi, Connect_DAC is supplied to each switch Sw4(i) (i=1~m) from the control unit 16 as a switch control signal S4. The switch Sw4(i) connects the output terminal of the data latch circuit 116(i) and the DAC side terminal through the Connect DAC signal.

Each switch Sw5(i) (i=1~m) is a switch for switching the connection between the input terminal of the data latch circuit 116(i) and any one of the data register block 112, level shift circuit 115(i), and switch Sw4(i).

The switch Sw5(i) connects the input terminal of the data latch circuit 116(i) and the output terminal of the level shift circuit 115(i) when the Connect_ADC signal is supplied to the switch 5(i) from the control unit 16 as the switch control signal S5.

The switch Sw5(i) connects the input terminal of the data latch circuit 116(i) and the front terminal of switch Sw4(i+1) when the Connect_rear signal is supplied to the switch5(i) from the control unit 16 as the switch control signal S5.

The switch Sw5(i) connects the input terminal of the data latch circuit 116(i) and the output terminal of the data register block 112 when the Connect_DRB signal is supplied to the switch5(i) from the control unit 16 as the switch control signal S5.

Switch Sw6 is a switch to connect or disconnect between the front terminal of the switch Sw4(1) and the control unit 16.

When the measurement voltage Vmeas(t) is output to the control unit 16 as the output signals Dout(1)~Dout(m), the switch Sw6 becomes an ON state when the On6 signal is supplied to the switch Sw6 from the control unit 16 as the switch control signal S6, connecting between the front terminal of the switch Sw4(1) and the control unit 16.

When the measurement voltage Vmeas(t) is completely output, the switch Sw6 becomes an OFF state when the Off6 signal is supplied to Sw6 from the control unit 16 as the switch control signal S6, interrupting the connection between the front terminal of the switch Sw4(1) and the control unit 16.

Going back to FIG. 1, the anode circuit 12 is for supplying current by impressing a voltage on the organic EL panel 21 via the anode line La.

Analog power source 14 is the power source to impress reference voltage Vref, voltages DVSS and DV0 on the data driver 22.

The reference voltage Vref is impressed on data driver 22 so as to draw current from each pixel 21(i,j) at the time of voltage measurement of data line Ldi with the Auto-zero method. The reference voltage Vref is a negative voltage to the power source voltage ELVSS that is impressed on each pixel drive circuit DC by the anode circuit 12, and the absolute value of the electric potential difference with respect to the power source voltage ELVSS is set to a value that is larger by the absolute value than the threshold voltage Vth of the transistor T3 of each pixel 21(i,j).

The analog voltages DVSS and VD0 are analog voltages for driving the buffer 113(i), buffer 119(i), ADC114(i), and VDAC118(i) (i=1~m). The analog voltage DVSS is a negative voltage to the power source voltage ELVSS that is impressed on the anode line La by the anode circuit 12 and set to, for example, around −12V.

Logic power source 15 is a power source for impressing the voltages LVSS and LVDD on the data driver 22. The voltages LVSS and LVDD are logic voltages for driving the data latch circuit 116(i) (i=1~m), the data register block, and the shift register of the data driver 22. Here, voltage DVSS, VD0, LVSS, and LVDD are set to satisfy the condition, for example, (DVSS−VD0)<(LVSS−LVDD).

Control unit 16 stores each data and controls each component based on the stored data. As described above, the control unit 16 in the present embodiment has a constitution to supply a digital data Din(i) (i=1~m) generated through various corrections for image data of supplied digital signals, to data driver 22, and processing calculations and such within the control unit 16 is performed on digital values. In addition, the following description will be given by comparing a digital signal appropriately to an analog voltage value for reasons of expediency.

The control unit 16 measures a voltage of data line Ldi with the Auto-zero method via data driver 22, for example, while controlling each component in an early stage such as shipment of the display device 1 and acquires measured voltages Vmeas(t1), Vmeas(t2), and Vmeas(t3) for all pixels 21(i,j).

Then, the control unit 16 acquires the C/β value of the pixel drive circuit DC and the (initial) threshold voltage Vth0 of the transistor T3 of each pixel 21(i,j) as the property parameter by calculating according to equation (103) while using the measured voltages Vmeas(t1) as well as Vmeas(t2). Further, the control unit 16 acquires the mean value <C/β> of the C/β for all pixels 21(i,j). Furthermore, settling time t0 for the real operation is determined and the offset voltage Voffset is acquired by calculating according to equation (105).

Moreover, the control unit 16 calculates the ΔVmeas(t3) by using the measured voltage Vmeas(t3) and acquires the irregularity parameter (Δβ/β) as the property parameter by calculating according to the equation (106).

Subsequently, the control unit 16 controls each component and acquires the measured voltage Vmeas(t0) for all pixels 21(i,j) when measuring the voltage of data line Ldi with the Auto-zero method while the settling time is t0 via the data driver 22 in operation when image data is supplied.

Control unit 16 acquires the voltage value Vdata0 by converting the data value (voltage magnitude) as described below, corresponding the gradation value of image data in every RGB based on the gradation voltage data corresponding to the supplied image data.

White display is required for each RGB to be at maximum gradation in a color display. However, the organic EL element 101 for each RGB color of pixel 21(i,j) normally has differing light emitting luminance properties for the current value of the supplied current.

As a result, a conversion is performed in the control unit 16 on the voltage magnitude for the image data gradation value on every RGB so that the current value of electric current supplied to the organic EL element 101 of each RGB color for image data gradation value can be mutually differing values as in a white display when each RGB is at maximum gradation.

Control unit 16 acquires the voltage value Vdata0 by performing this type of voltage magnitude conversion on all pixels 21(i,j).

Control unit 16, after acquiring the voltage value Vdata0, acquires the corrected voltage value Vdata1 based on (Δβ/β) according to equation (107).

Control unit 16 acquires the corrected voltage value Vdata based on the threshold voltage Vth as the final output voltage according to equations (108) and (109). More specifically, the control unit 16 corrects the voltage value Vdata1 by bit addition of the corresponding threshold voltage with to acquire the voltage value Vdata.

Control unit 16 outputs corrected image data Vdata for all pixels 21(i,j) to the data driver 22 one row at a time as digital data Din(i) (i=1~m).

Figure 7:
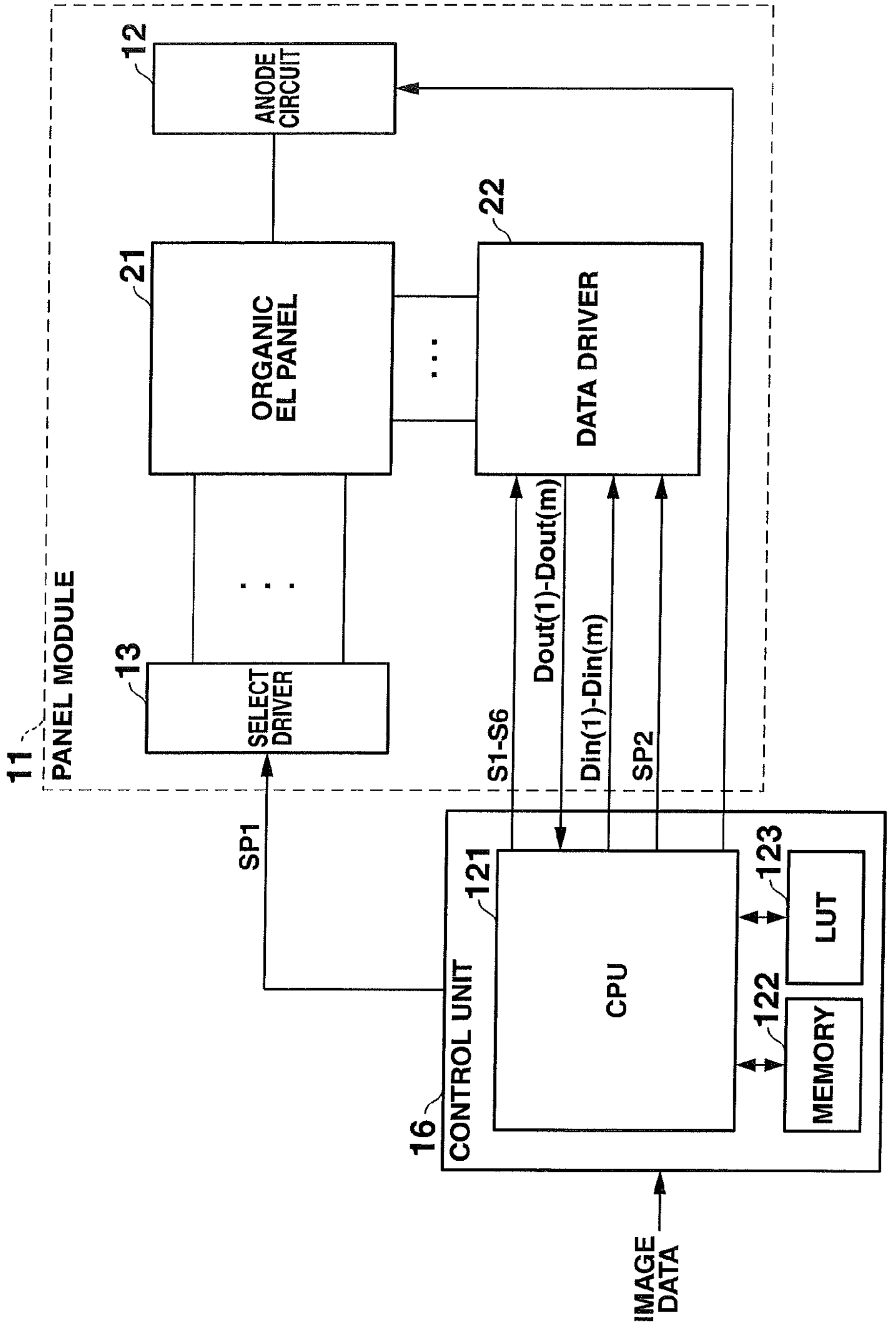
FIG. 7 is a block diagram showing the constitution of the control unit shown in FIG. 1.

FIG. 7 is a block diagram showing a constitution of the control unit shown in FIG. 1.

Figure 8:
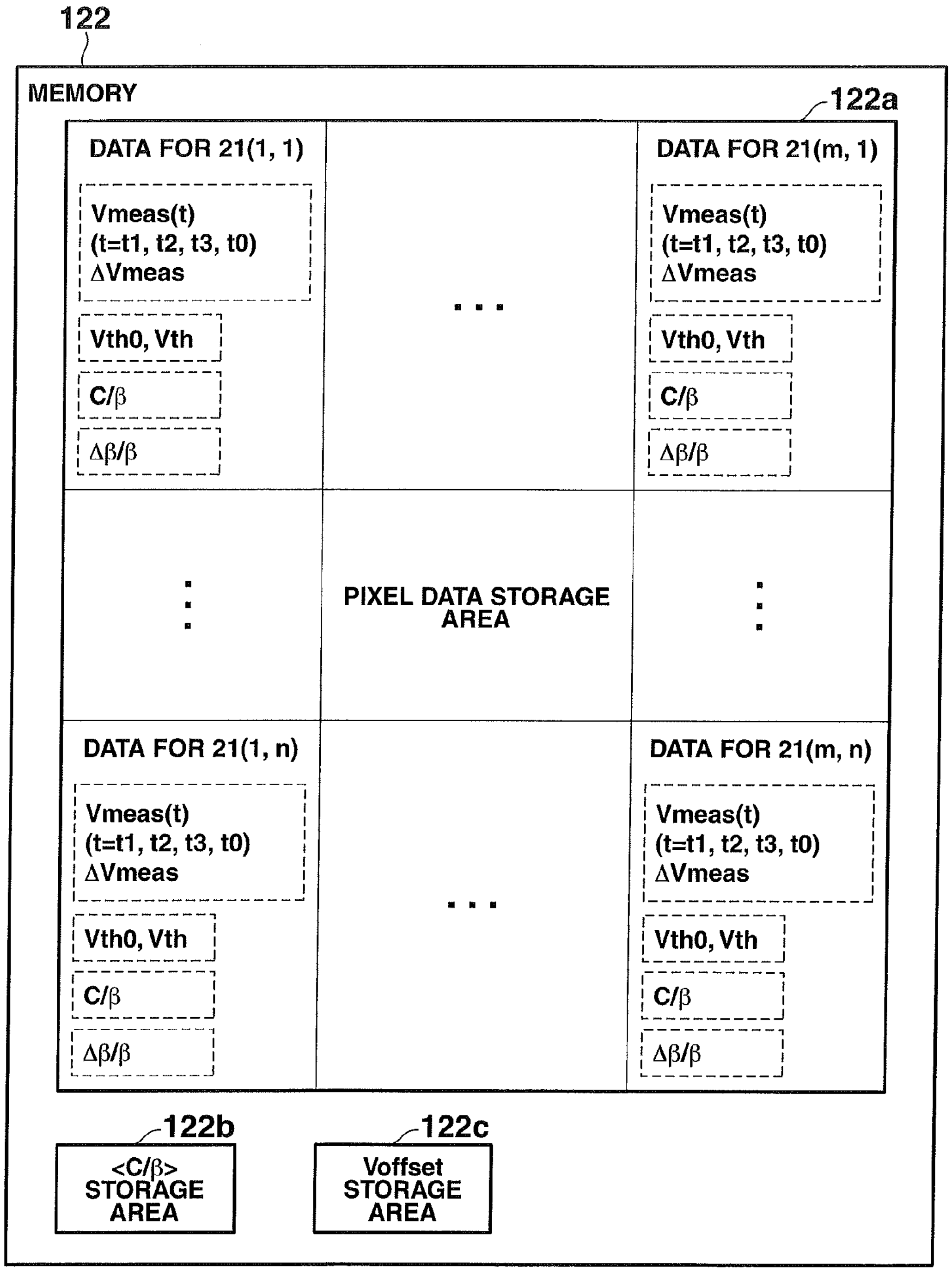
FIG. 8 is a diagram showing each storage area of the memory shown in FIG. 7.

FIG. 8 is a diagram showing each storage area of the memory shown in FIG. 7.

Control unit 16 provides a CPU (Central Processing Unit) 121, memory 122, and LUT (Look Up Table) 123 as shown in FIG. 7 in order to perform the processing described above.

CPU 121 is for controlling the anode circuit 12, select driver 13, and data driver 22, and for performing each of the various computations.

Memory 122 is composed of ROM (Read Only Memory), RAM (Random Access Memory) and the like, and which stores each processing program executed by the CPU 121 and stores various data that is necessary for processing.

Memory 122 provides a pixel data storage area 122*a*, <C/β> storage area 122*b* and Voffset storage area 122*c*, as shown in FIG. 8, as the areas to store various data.

The pixel data storage area 122*a* is an area for storing each data of the measured voltages Vmeas(t1), Vmeas(t2), Vmeas (t3), Vmeas(t0), ΔVmeas, threshold voltage Vth0, Vth, C/β, and Δβ/β for each pixel 21(i,j).

<C/β> storage area 122*b* is an area for storing the mean value <C/β> of each pixel 21(i,j) C/β.

Voffset storage area 122*c* is an area for storing the offset voltage Voffset defined according to equation (105).

LUT 123 is a preset table in order to convert the data values of each RGB color for the supplied image.

Control unit 16 converts the data value for each RGB for a supplied image data value by referring to the LUT 123.

Figure 9A:
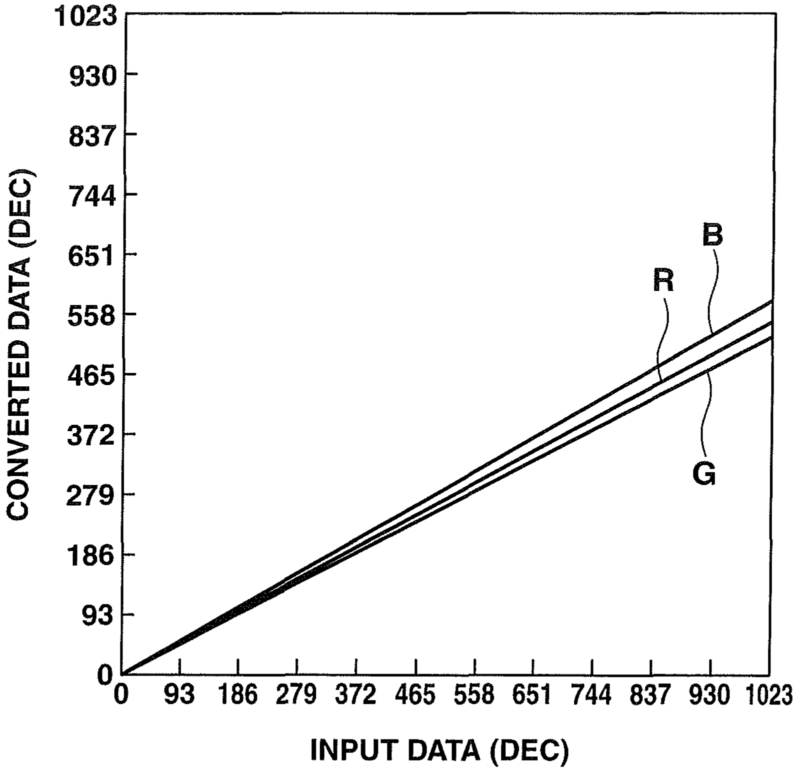
FIGS. 9A and B are graphs showing an example of image data conversion properties in LUT shown in FIG. 7.

Next, FIGS. 9A and B are graphs showing an example of image data conversion properties in the LUT shown in FIG. 7 when data conversion is performed in case the VDAC 118(i) is 10 bits.

Figure 10A:
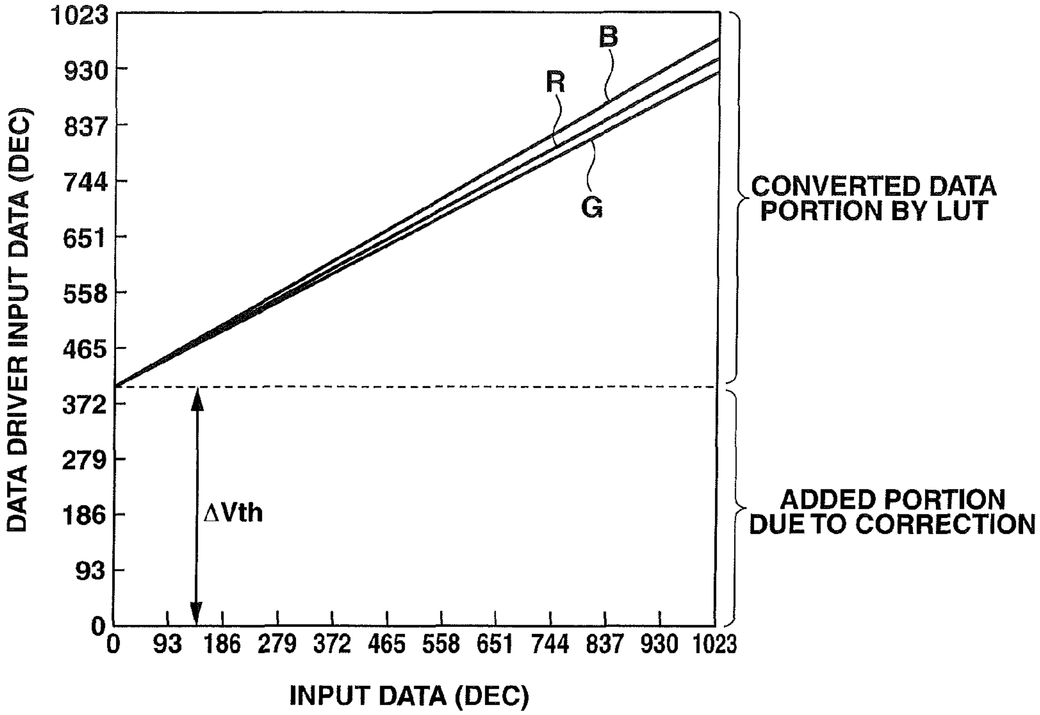
FIGS. 10A and B are diagrams to explain the image data conversion properties in LUT shown in FIG. 7.

FIGS. 10A and B are graphs to explain image data conversion properties in the LUT. With this example, post-conversion data values differ in the order of blue (B)>red (R)>green (G).

Figure 9B:
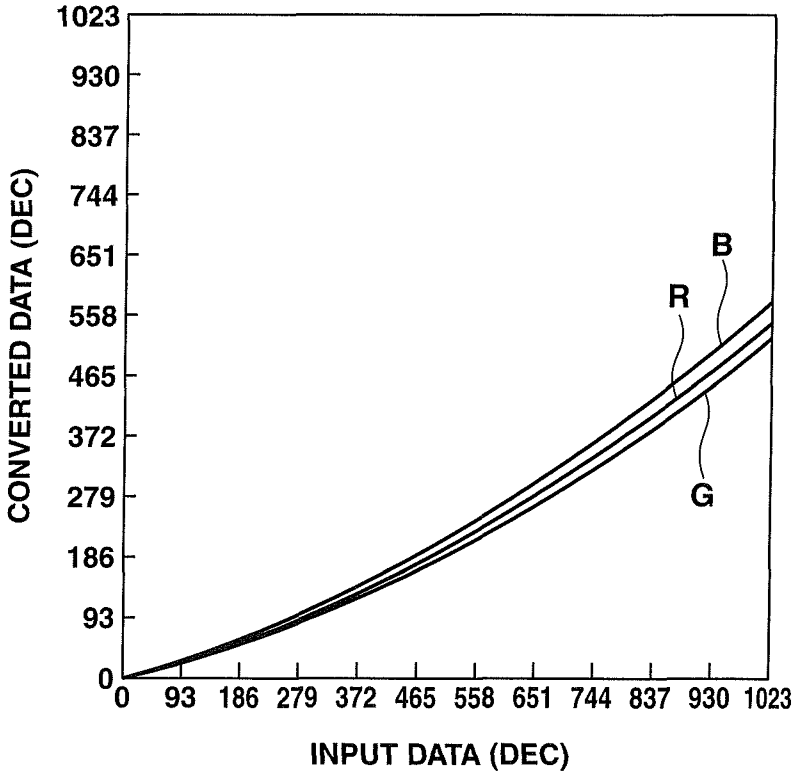

First, the horizontal axes of FIGS. 9A and B show the input data, that is, image data gradation values when image data is 10 bits. The vertical axes of FIGS. 9A and B show gradation values of converted data to which image data is converted by the LUT 123. RGB voltage magnitude is set based on this converted data in the data driver 22. In addition, the conversion properties of converted data gradation values for the image data gradation values are set in advance in the LUT123. FIG. 9A shows when a converted data gradation value is set in a linear relationship with an image data gradation value. FIG. 9B shows when a converted data gradation value is set so as to have a curvilinear gamma property for image data gradation value. The relationship of a converted data gradation value to an image data gradation value in the LUT123 can be freely set as necessary.

Here, VDAC 118(i) of the data driver 22 can receive input data of 0~1023 when having a 10 bit composition. However, converted data after conversion by the LUT 123 is set around 0~600. This is based on the following reasons.

The horizontal axes of FIGS. 10A and B show the input data, the same as in FIGS. 9A and B. The vertical axes of FIGS. 10A and B show digital data Din(i) that is input to the data driver 22 from the control unit 16, corresponding to an image data gradation value.

Figure 10B:
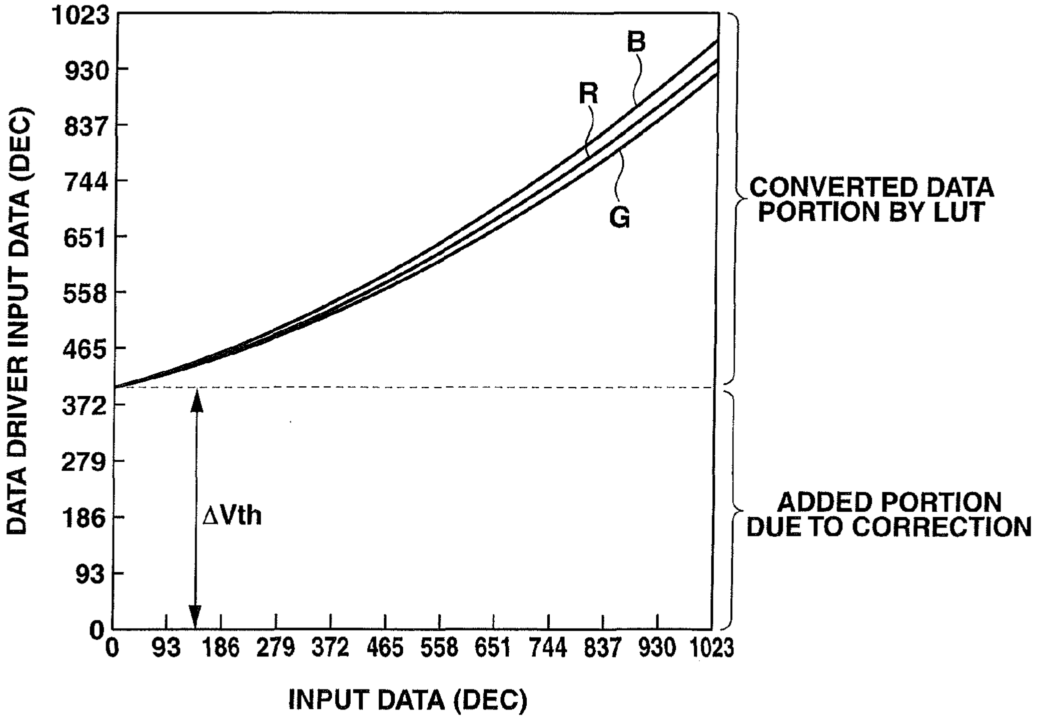

Here, FIG. 10A is based on FIG. 9A and FIG. 10B is based on FIG. 9B. As described above, a correction is performed on supplied image data based on the evaluation value of the threshold voltage Vth in the control unit 16 in the present embodiment.

This correction includes, as shown in the equation (109), a correction based on the irregularity of the current amplification factor β for image data, and a correction to add the amount that corresponds to the threshold voltage Vth for data obtained as a result of the correction thereof.

Here, because the gradation voltage VD1 in VDAC 118 of the data driver 22 is set to the value when the threshold voltage Vth is the initial value Vth0 as described above, the amount for adding according to the correction to the gradation voltage VD1 is the amount that corresponds to ΔVth that is the amount of change from the initial value Vth0 of the threshold voltage Vth.

Here, the gradation value of digital data Din(i) output from the control unit 16 must be within the input enabled range (0~1023) of the VDAC 118(i) of the data driver 22.

Accordingly, the maximum value of the converted data gradation value after being converted by the LUT 123 is set to a value in which the amount to be added by the correction is subtracted beforehand from the input enabled range of the VDAC 118(i) of the data driver 22.

Here, the amount to be added by the correction is not a fixed amount since it is determined according to the amount of change ΔVth of the threshold voltage Vth, and it increases gradually over time of use.

Accordingly, the maximum value of the converted data gradation value by the LUT 123 is determined, for example, by estimation of the maximum value of the amount that is added by the correction based on the estimated time of use of the display device 1.

In addition, when the gradation value of image data is zero in a black display, the organic EL element 101 is in a non-luminous state. Therefore, there is no need for conducting the above correction at this time. As a result, when image data in a black display has zero gradation, the control unit 16 supplies the zero gradation as is to the data driver 22 without conducting a fluctuation correction on the threshold and without referring to the LUT 123.

A description is provided hereafter of the operation of display device 1 according to an embodiment.

In the initial step, the control unit 16 controls the anode circuit 12 to impress voltage ELVSS on the anode line La when voltage measurement of each data line Ldi is conducted with the Auto-zero method.

Figure 11:
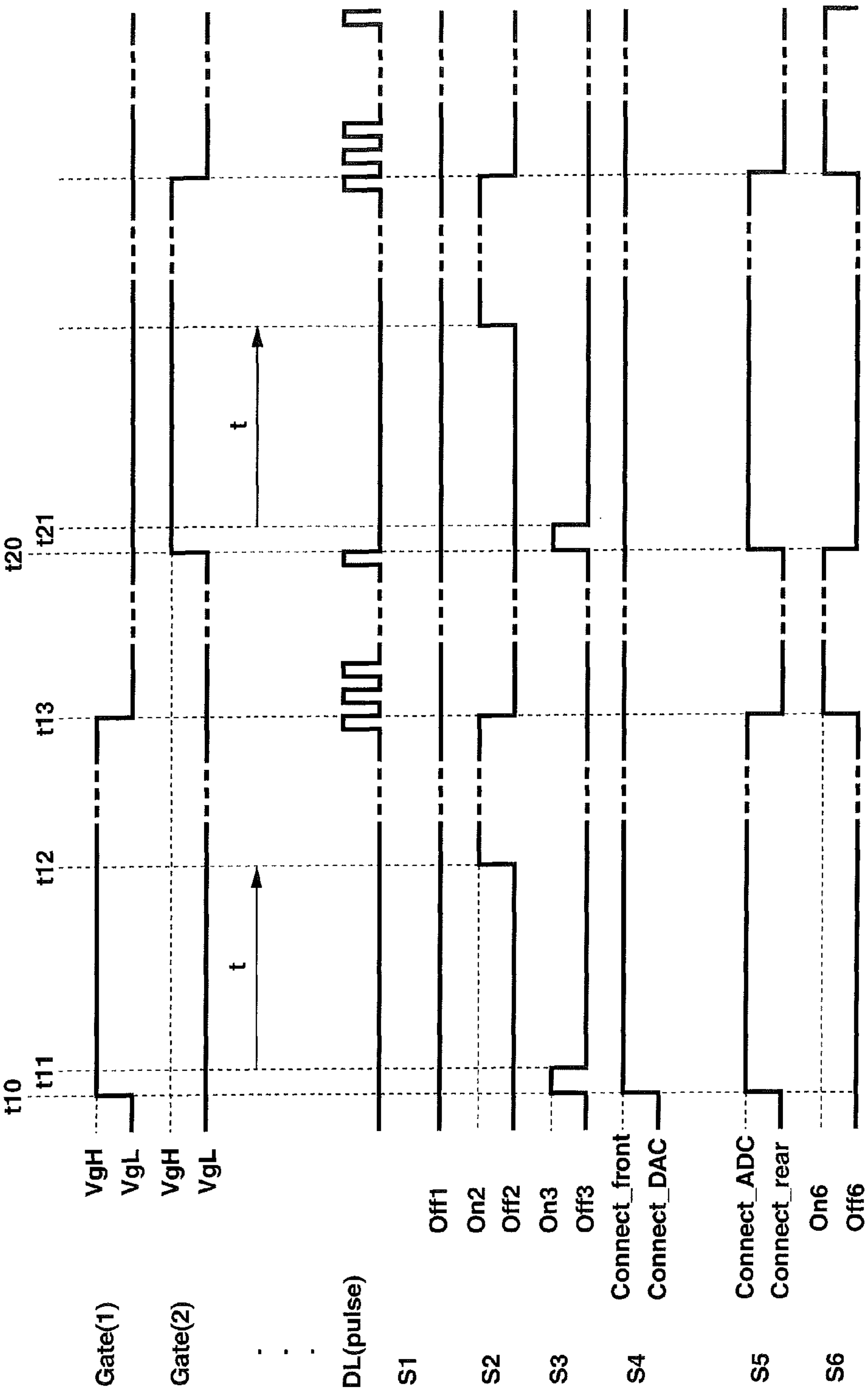
FIG. 11 is a timing chart showing the operation of each component when voltage measurement is conducted with the Auto-zero method.

FIG. 11 is a timing chart showing an operation of each component when undertaking voltage measurement with the Auto-zero method.

Control unit 16, as shown in FIG. 11, supplies the start pulse to the select driver 13 at the time t10. At this time, the select driver 13 outputs the VgH level Gate(1) signal to the select line Ls1.

When a VgH level Gate(1) signal is output to the select line Ls1 by the select driver 13, the transistors T1 and T2 of the first column of pixels 21(i,1) (i=1~m) becomes an ON state. When the transistor T1 is in an ON state, the gate-to-drain of transistor T3 is connected and the transistor 3 becomes a diode-connected state.

The control unit 16 supplies each of the signals Off1, Off2, On3, Connect_front, Connect_ADC, and Off6 to the data driver 22 as the switch control signals S1~S6 at the time t10.

Figure 12A:
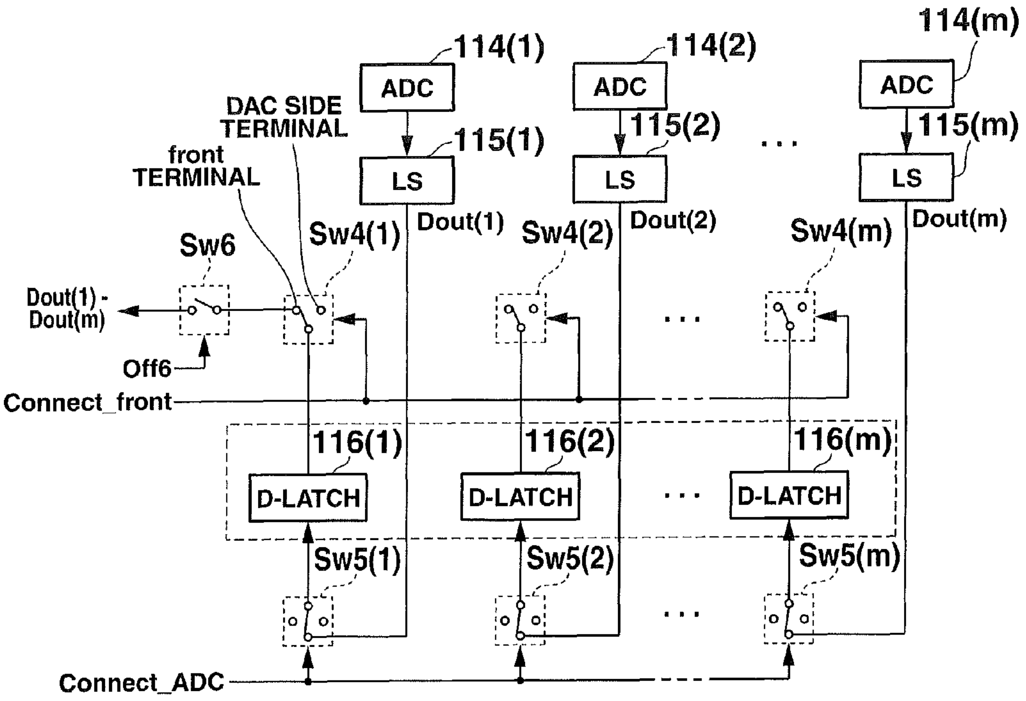
FIGS. 12A and B are diagrams showing the connectivity relationships for each switch when outputting data from the data driver to the control unit.

FIGS. 12A and B are diagrams showing the connectivity relationships for each switch when outputting data from the data driver to the control unit 16.

At this time, the Connect_front signal is supplied from the control unit 16, and the switch Sw4(i), as shown in FIG. 12A, connects the output terminal of the data latch circuit 116(i) with the front terminal (i=1~m).

At this time, the Connect_ADC signal is supplied from the control unit 16, and the switch Sw5(i), as shown in FIG. 12A, connects the input terminal of the data latch circuit 116(i) with the output terminal of the level shift circuit 115(i) (i=1~m).

Figure 13C:
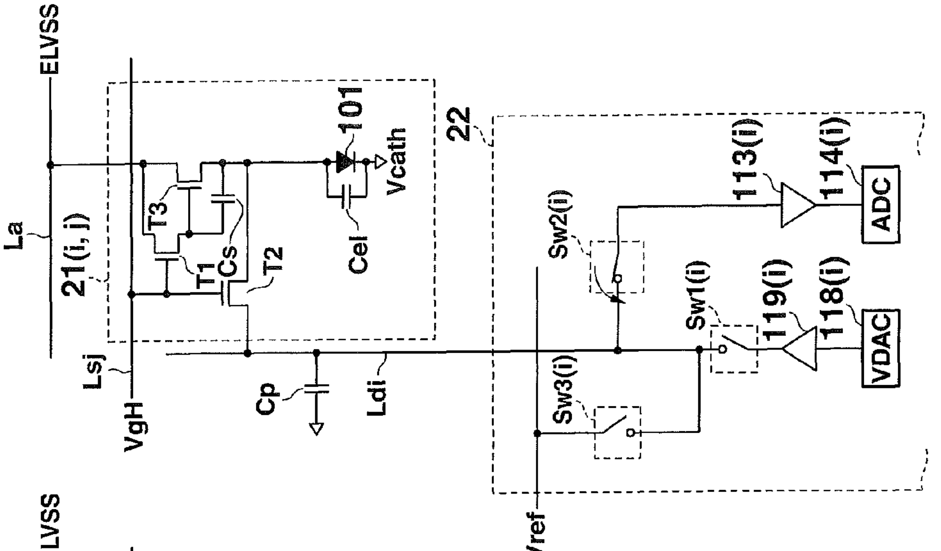
FIGS. 13A, B, and C are diagrams showing the connectivity relationships for each switch when voltage measurement is conducted with the Auto-zero method.
Figure 13B:
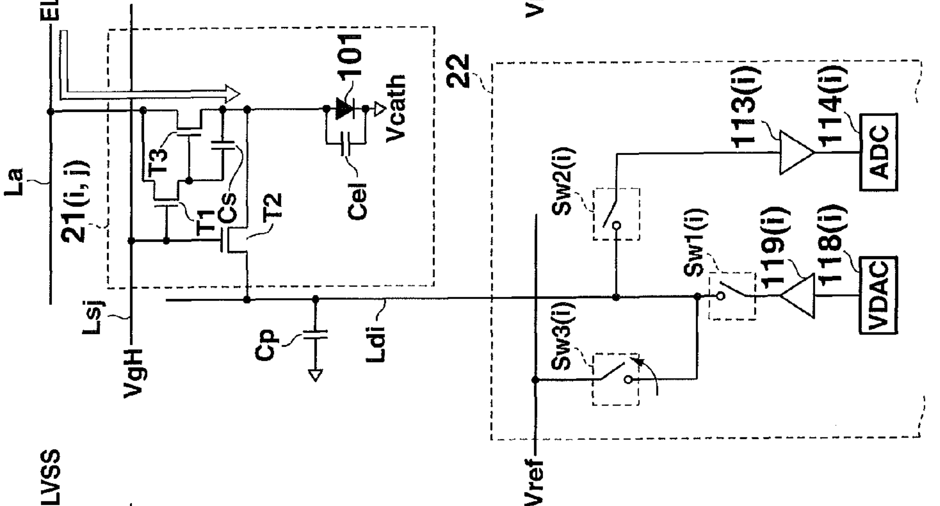
Figure 13A:
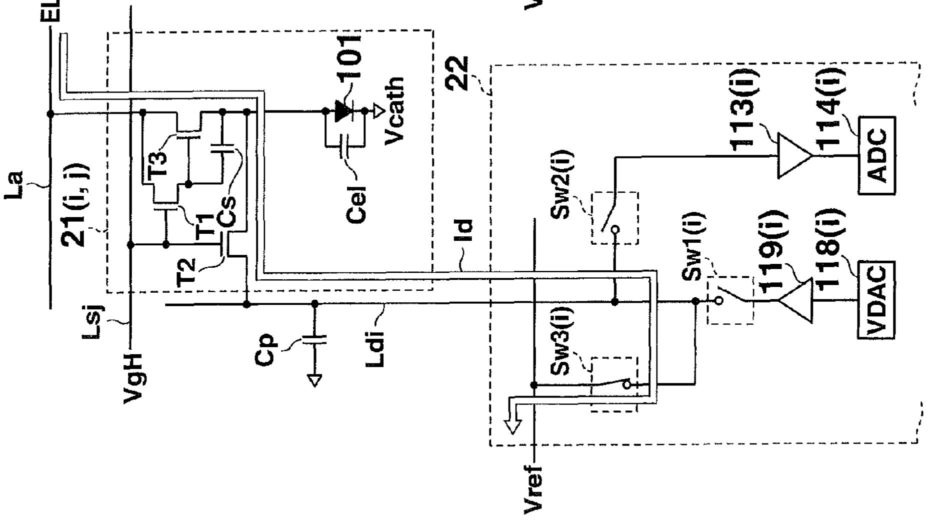

FIGS. 13A, B, and C are diagrams showing the connectivity relationships for each switch when voltage measurement is conducted with the Auto-zero method.

The switches Sw1(i) and Sw2(i) become an OFF state, when the Off1 and Off2 signals are supplied to them respectively from the control unit 16. Further, the switch Sw3(i) becomes ON state when the On3 signal is supplied to it from the control unit 16 (i=1~m).

Because the reference voltage Vref of the analog power source 14 has voltage with negative polarity, when the transistors T1 to T3 are in the ON state, the analog power source 14 draws current Id through the data line Ldi from the ith row of pixels 21( i,1) (i=1~m).

At this time, the organic EL element 101 of the first column of pixels 21(i,1) (i=1~m) does not illuminate because the cathode side electric potential is Vcath and the anode side becomes more negative electric potential than Vcath resulting in a reverse bias and current will not flow.

Because the Switches Sw1(i) and Sw2(i) (i=1~m) are in the OFF state, the current Id drawn by the analog power source 14 is unable to flow to the buffer 113(i), 119(i) (i=1~m).

Therefore, the current Id, as shown in FIG. 13A, flows to the analog power source 14 via each data line Ldi from the transistors T3 and T2 of the first column of pixels 21(i,1) (i=1~m).

When the current Id flows, the holding capacity Cs of each pixel 21(i,1) (i=1~m) is charged with voltage determined by the reference voltage Vref.

Subsequently, at the time t11 when the charging of these capacities has been completed, the control unit 16 supplies the Off3 signal to the data driver 22 as the switch control signal S3.

When the Off3 signal is supplied from the control unit 16, as shown in FIG. 13B, the switch Sw3(i) becomes an OFF state. At this time, each of the switches Sw1(i) and Sw2(i), remain in the OFF state. Accordingly, by switching the switch Sw3(i) into an OFF state, the connection between the organic EL panel 21 and the data driver 22 is interrupted. In this manner a high impedance state (HZ) is created for the data line Ldi.

Immediately subsequent to establishing a high impedance state in the data line Ldi, the charge stored in the holding capacity Cs is held at the last prior value thereby maintaining an ON state in the transistor T3.

In this manner, current continues to flow between the drain-to-source of transistor T3 and the electric potential of the source terminal side of transistor T3 gradually increases to approach the electric potential of the drain terminal side. Therefore, the current value of the current flowing between the drain-to-source of transistor T3 continues to reduce.

In conjunction with this, a part of the charge stored in the holding capacity Cs is discharged, and the voltage between both terminals of the holding capacity Cs continues to decrease. Through this, the gate voltage Vgs of transistor T3 gradually lowers thereby gradually lowering the absolute value of the voltage of the data line Ldi from the reference voltage Vref.

At the time t12 which is the time when a predetermined settling time t elapses from the time t11, the control unit 16 supplies the On2 signal as the switch control signal S2 to the data driver 22. This settling time t is set so as to satisfy the condition C/(βt)<1.

At this time, as shown in FIG. 13C, the switch Sw2(i) becomes ON state with On2 signal supplied from the control unit 16, and ADC 114(i) acquires the voltage value of the data line Ldi as the measured voltage Vmeas(t1) (i=1~m).

The level shift circuit 115(i) level-shifts the measured voltage Vmeas(t1) acquired by the ADC 114(i) (i=1~m).

As shown in FIG. 12A, because the input terminal of the data latch circuit 116(i) and the output terminal of the level shift circuit 115(i) are each connected through the switch Sw5(i), the measured voltage Vmeas(t1), which is level-shifted by each level shift circuit 115(i), is supplied to the data latch circuit 116 (i=1~m).

Control unit 116 outputs the data latch pulse DL (pulse) to the data driver 22, and upon receipt of this pulse, each of the data latch circuit 116(i) (i=1~m) holds the measured voltages Vmeas(t1) supplied.

Figure 12B:
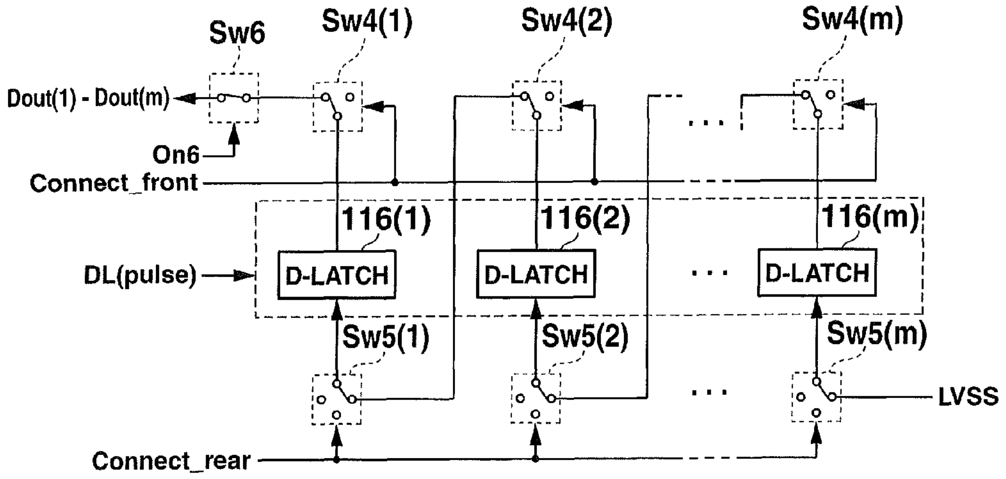

At the time t13 that the Gate(1) signal falls, the control unit 16 supplies the On6 signal to data driver 22 as the switch control signal S6, and upon receipt of this signal, the switch Sw6 becomes an ON state as shown in FIG. 12B.

As shown in FIG. 12B, the output terminal of data latch circuit 116(1) and one terminal of the switch Sw6 are connected through the front terminal of the switch Sw4(1) by the Connect_rear signal supplied for the switch Sw4(i) from the control unit 16, and the output terminal of the data latch circuit 116(i) and the input terminal of the switch Sw5(i−1) are connected through the front terminal of the switch Sw4(i) (i=2~m).

Therefore, the data latch circuit 116(i) sequentially forwards the measured voltage Vmeas(t1) of the data line Ldi for the first column of pixels 21(i,1), which is held by the data latch circuit 116, each time the DL (pulse) is supplied from the control unit 16, and outputs as data Dout(i) to the control unit 16 (i=1~m).

Control unit 16 acquires the data Dout(i) (i=1~m) and stores this data in the pixel data storage area 122*a* of the memory 122 shown in FIG. 8. The voltage measurement of the first column of pixels 21(i,1) (i=1~m) is completed in this manner.

When the Gate(2) signal rises at the time t20, the control unit 16, in the same manner as described above, supplies the switch control signals S1~S6 to the data driver 22 thereby performing the voltage measurement of the data line Ldi (i=1~m) for the second column of pixels 21(i,2).

This measurement is repeated for every column and after performing voltage measurement on the data line Ldi (i=1~m) for the nth column of pixel 21(i,n), every voltage measurement in time t1 is completed.

Thereafter, the control unit 16, in the same manner, sets the settling time t to t2 and performs voltage measurement for the data line Ldi for each pixel 21(i,j) (i=1~m, j=1~n). The control unit 16 acquires the measured voltage Vmeas(t2) of the data line Ldi for each pixel 21(i,j) for settling time t2, and stores it in the pixel data storage area 122*a* of the memory 122(i=1~m, j=1~n).

Next, the control unit 16, in the same manner, sets the settling time t to t3 and performs voltage measurement for the data line Ldi for each pixel 21(i,j) (i=1~m, j=1~n). The control unit 16 acquires the measured voltage Vmeas(t3) of the data line Ldi for each pixel 21(i,j) for settling time t3, and stores it in the pixel data storage area 122*a* of the memory 122 (i=1~m, j=1~n).

Figure 14:
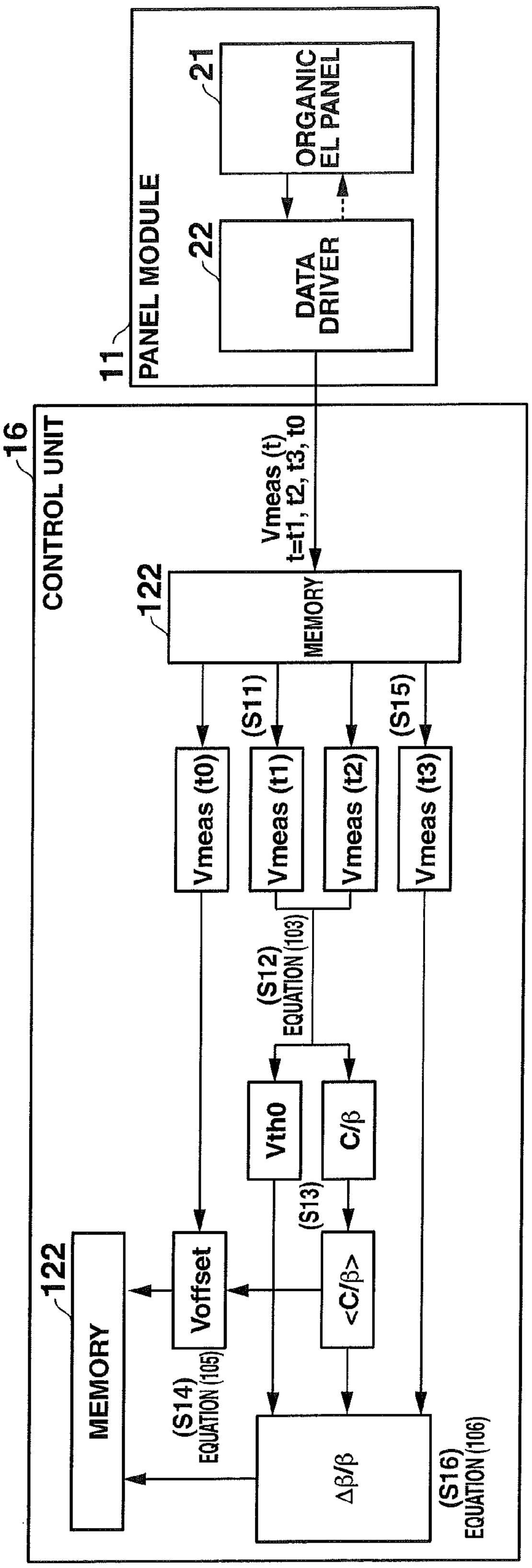
FIG. 14 is a diagram to explain the drive sequence executed by the control unit when a property parameter is acquired for correction.

FIG. 14 is a diagram to explain the drive sequence executed by the control unit when a correction parameter is acquired.

Control unit 16 acquires the measured voltages Vmeas(t1), Vmeas(t2), and Vmeas(t3) and after storing them in each pixel data storage area 122*a* of the memory 122, it calculates according to the drive sequence shown in FIG. 14 thereby acquiring the correction parameter.

Control unit 16 reads the measured voltages Vmeas(t1) and Vmeas(t2) of the data line Ldi for pixel 21(1,1) from each pixel data storage area 122*a* of memory 122 (Step S11).

Further, control unit 16 calculates according to equation (103) thereby acquiring C/β and the threshold voltage Vth0 for pixel 21(1,1) (Step S12).

Control unit 16 executes this process for every pixel 21(i,j) (i=1~m, j=1~n). Once C/β and the threshold voltage Vth0 for every pixel 21(i,j) are acquired, the mean values <C/β> for the C/β of every pixel 21(i,j) are acquired (Step S13), and the settling time t=t0 is set in operation.

Control unit 16 acquires the offset voltage Voffset defined by equation (105) using the determined settling time t0 (Step S14).

Control unit 16 stores the acquired mean value <C/β> and the offset voltage Voffset respectively in the <C/β> storage area 122*b* and offset voltage storage area 122*c* of the memory 122. The control unit 16 further reads the measured voltage Vmeas(t3) of the pixel 21(i,j) from each pixel data storage area 122*a* of the memory 122 (I=1~m, j=1~n) (Step S15).

Control unit 16 calculates by modifying the equation (106) using the previously acquired Vth0 as the Vth with the measured voltage Vmeas(t3) of each pixel 21(i,j) to acquire the Δβ/β for each pixel 21(i,j) (i=1~m, j=1~n) (Step S16).

Control unit 16 stores the acquired Δβ/β in each pixel data storage area 122*a* of the memory 122.

Figure 15:
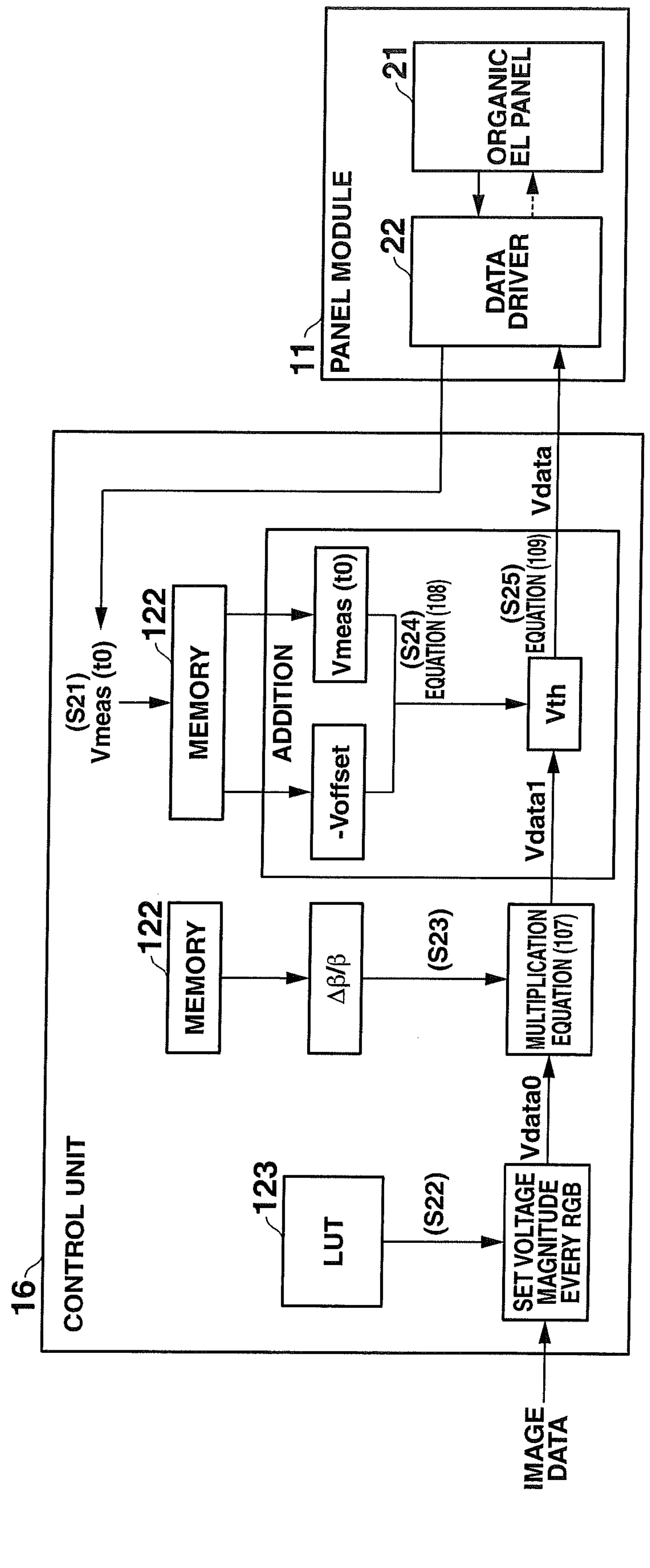
FIG. 15 is a diagram to explain the drive sequence executed by the control unit when a voltage signal based on supplied image data is output to the data driver after correction.

FIG. 15 is a diagram to explain the drive sequence executed by the control unit 16 when a voltage signal based on supplied image data is output to the data driver after correction.

Image data is supplied to the control unit 16 in operation. The control unit 16 corrects the image data according to the drive sequence (2) shown in FIG. 15.

Control unit 16 controls each component according to the timing chart shown in FIG. 11, and acquires the measured voltage Vmeas(t0) for the settling time t=t0 determined for real operation from the data driver 22 (Step S21). Then, control unit 16 stores the acquired measured voltage Vmeas (t0) in the pixel data storage area 122*a* of the memory 122.

Control unit 16 converts the gradation value for each RGB image data referencing LUT 123 for pixel data 21(i,j) (i=1~m, j=1~n) when the digital signal of the image data is input. The converted gradation value is designated as the voltage value Vdata0 and is made the original gradation signal for each pixel 21(i,j) (Step S22).

The maximum value of the original gradation signal, as described above, is set to a value that is below a value in which the correction amount is subtracted based on property parameters such as the threshold voltage Vth described above from the maximum value in the input range of the VDAC 118(i).

Control unit 16 acquires a signal that corresponds to the voltage value Vdata1 by calculating according to equation (107) using Δβ/β as the correction parameter of the irregularity of β (Step S23).

Control unit 16 reads the offset voltage Voffset from the offset voltage storage area 122*c* of the memory 122 and acquires the threshold voltage Vth as the correction amount by calculating according to equation (108) using the measured voltage Vmeas(t0) and the offset voltage Voffset (Step S24).

Control unit 16 acquires a signal that corresponds to the voltage value Vdata as the corrected gradation signal by adding the voltage value Vdata1 and the threshold voltage Vth according to the equation (109) (Step S25).

Control unit 16 executes this type of drive sequence (2) for each pixel. Further, the control unit 16 outputs a signal that corresponds to the voltage value Vdata to the data driver 22 as data Din(1)~Din(m) for each pixel.

Figure 16:
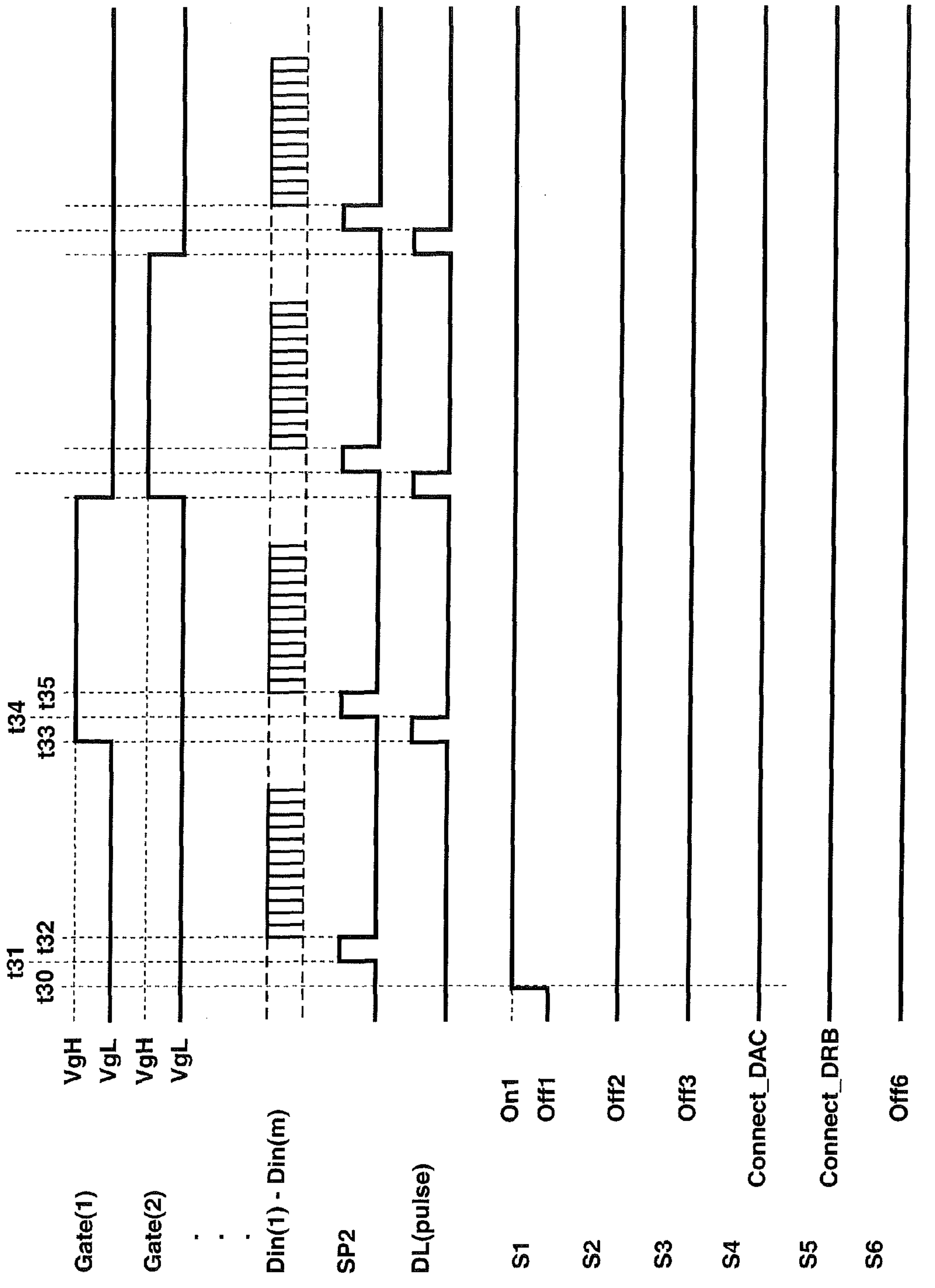
FIG. 16 is a timing chart showing an operation of each component when in operation.

FIG. 16 is a timing chart that shows the operation of each component in operation.

Control unit 16 controls each component according to the data output timing chart shown in FIG. 16 and outputs data Din(1)~Din(m) to the data driver 22.

Control unit 16 supplies each of the signals Off1, Off2, Off3, Connect_DAC, Connect_DRB, and Off6 as switch control signals S1~S6 to the data driver 22 at the time t30.

Figure 17:
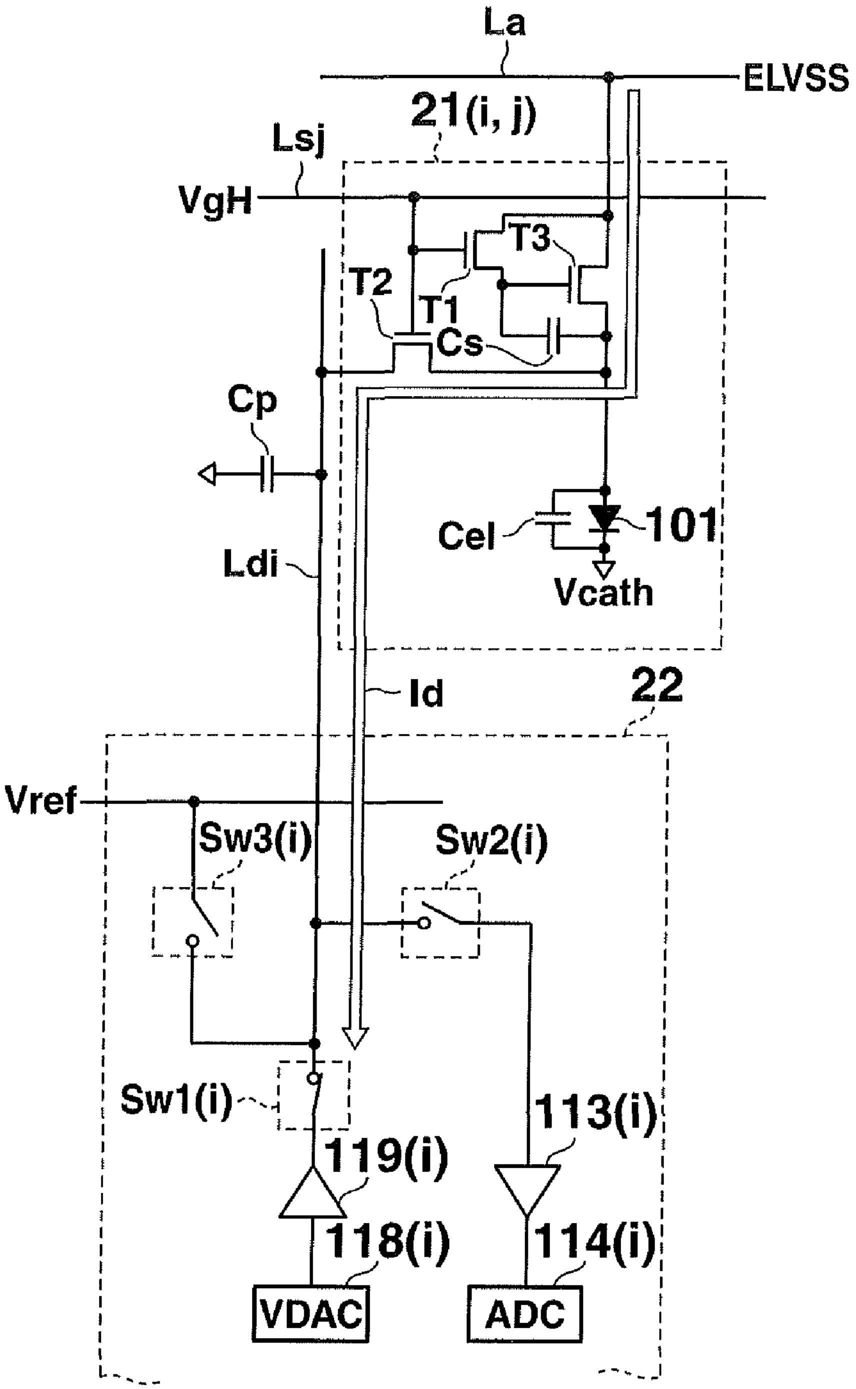
FIG. 17 is a diagram showing the connectivity relationships for each switch when a voltage signal is written.

FIG. 17 is a diagram showing the connectivity relationships for each switch when a voltage signal is written.

Sw2(i) and Sw3(i), as shown in FIG. 17, each enter an OFF state when the Off2 and Off3 signals are supplied from the control unit 16, interrupting the connections between the buffer 113(i) and the data line Ldi, and between the analog power source 14 and the data line Ldi.

Each switch Sw1(i) becomes ON state when the On1 signal is supplied from the control unit 16, thereby connecting the VDAC 118(i) and the data line Ldi through the buffer 119(i).

Figure 18:
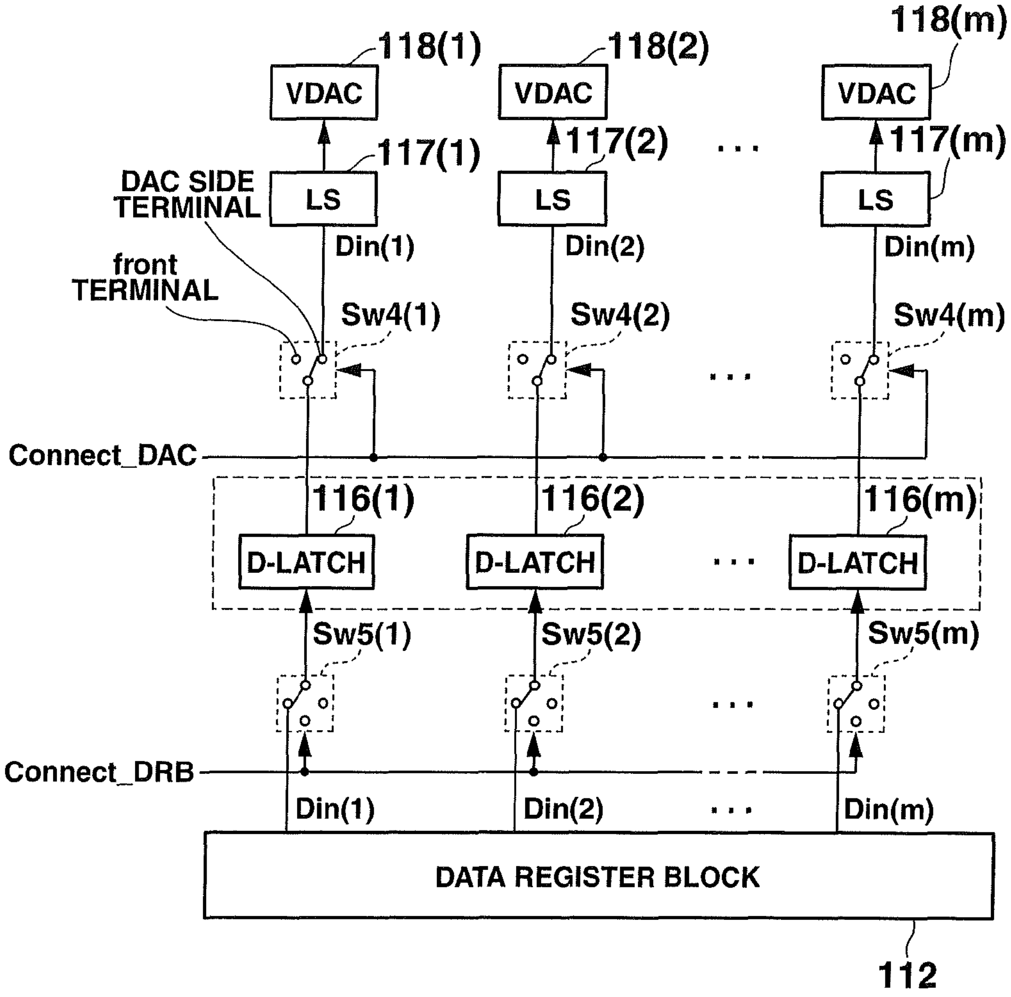
FIG. 18 is a diagram showing the connectivity relationships for each switch when data is input to the data driver from the control unit.

FIG. 18 is a diagram showing the connectivity relationships for each switch when data is input to the data driver 22 from the control unit 16.

Each switch Sw5(i), as shown in FIG. 18, connects the input terminal of the data latch circuit 116(i) and the output terminal of the data register block 112 when the Connect_DRB signal is supplied to each of them from the control unit 16.

Each switch Sw4(i) connects the output terminal of the data latch circuit 116(i) and the DAC side terminal when the Connect_DAC signal is supplied to each of them from the control unit 116.

Switch Sw6 becomes an OFF state when the Off6 signal is supplied to it from the control unit 16, interrupting the connection between the data latch circuit 116(1) and the control unit 16.

Control unit 16, as shown in FIG. 16, raises the start pulse SP2 at time t31 and drops the start pulse SP2 to Lo-Level at time t32.

When the start pulse SP2 is dropped to Lo-level, the shift register 111 of the data driver 22 shown in FIG. 5 generates a shift signal by sequentially shifting the start pulse SP2 according to a clock signal and supplies the generated shift signal to the data register block 112.

The data register block 112 sequentially fetches data Din (1)~Din(m) by synchronizing with the supplied shift signals.

When the Gate(1) signal is raised to the VgH level at the time t33, each transistor T1 and T2 of pixel 21(i,1) (i=1~m) becomes an ON state.

Control unit 16 raises the data latch pulse DL (pulse) and the data latch circuit 116(i) (i=1~m) of the data driver 22 latches the data at a timing when the data latch pulse DL (pulse) is raised.

Level shift circuit 117(i) performs a level-shift on the data latched by the data latch circuit 116(i) and supplies the level-shifted data to the VDAC 118(i) (i=1~m).

VDAC 118(i) converts the digital data to negative analog voltage and impresses the converted negative analog voltage on the data line Ldi through the buffer 118(i) (i=1~m).

When the negative analog voltage is impressed on the data line Ldi, the organic EL element 101 of each pixel 21(i,1) (i=1~m) becomes reverse biased preventing current flow. The electric current flows from the anode circuit 12 to the VDAC 118(i) of the data driver 22 through the data line Ldi, and the transistors T3 and T2 of pixel 21(i,1) (i=1~m).

Since transistor T1 of each pixel 21(i,1) (i=1~m) is in an ON state, transistor t3 is connected gate-to-drain and is diode-connected. Therefore, transistor T3 operates within a saturated region and drain current Id flows according to the diode properties in transistor T3.

Since the transistor T1 is ON state and the drain current Id flows to the transistor t3, the gate voltage Vgs of transistor T3 is set to a voltage that determines the drain current Id and the holding capacity Cs is charged by the gate voltage Vgs.

In this manner, the data driver 22 draws the current corrected based on the correction parameter from transistor T3 of each pixel 21(i,1) (i=1~m) as shown in FIG. 17, and the gate voltage Vgs of transistor T3 based on the voltage value Vdata is held with the holding capacity Cs.

The writing of the data into the holding capacity Cs for each pixel 21(i,1) (i=1~m) in the first column is completed in this manner.

Control unit 16, at the time t34, raises the start pulse SP2 with the dropping of the DL (pulse), and at the time t35, drops the start pulse SP2 and writes the data into the holding capacity Cs for each pixel 21(i,2) (i=1~m) in the second column.

Thereafter, the control unit 16, in the same manner, sequentially writes the voltage into the holding capacity Cs for pixel 21(i,3) (i=1~m), . . . , 21i,n) (i=1~m) based on the voltage value Vdata.

After writing of the voltage value Vdata into the holding capacity Cs for all pixels 21(i,j) is performed, and when the Gate(n) signal is VgL, transistors T1 and T2 for all pixels 21(i,j) become an OFF state.

When the transistors T1 and T2 for all of the pixels 21(i,j) become an OFF state, transistor T3 becomes a non-selectable state. When transistor T3 becomes a non-selectable state, gate voltage Vgs of transistor T3 is held at the written voltage in the holding capacity Cs.

Control unit 16 controls the anode circuit 12 so that the voltage ELVDD is impressed on the anode line La. This voltage ELVDD is set, for example, to 15V.

At this time, since the gate voltage Vgs of transistor T3 is held by the holding capacity Cs, a drain current Id of the same value as the current which flows between the drain-to-source of transistor T3 when the current value Vdata is written into the holding capacity Cs.

Since the transistor T2 is in the OFF state and the electric potential of the anode side of the organic EL element 101 is higher than the electric potential of the cathode side of it, drain current Id is supplied to the organic EL element 101.

At this time, the current Id that flows to the organic EL element 101 of each pixel 21(i,j) is corrected based on the fluctuations in the threshold voltage Vth and the irregularity of β, and the organic EL element 101 illuminates with the corrected current.

As described above, the display device 1 according to the present embodiment selects a settling time, for example, t1 and t2, that satisfies $(C/\beta)/t<1$ as the settling time t, and according to the Auto-zero method, performs voltage measurement of each data line Ldi the number of times that corresponds to the number of selected settling times.

Display device 1 selects time t3 which satisfies $((C/\beta)/t\geqq 1$ as the settling time t, and according to the Auto-zero method, performs voltage measurement of each data line, thereby acquiring $(\Delta\beta/\beta)$ indicating the irregularity of the current amplification factor β of the pixel drive circuit for each pixel.

Therefore, the display device 1 corrects the voltage value Vdata0 based on the image data supplied in operation base on the acquired ($\Delta\beta/\beta$) and thus has the ability to acquire the corrected voltage value Vdata1. Further, It corrects the corrected voltage value Vdata1 based on the acquired threshold voltage Vth and thus has the ability to acquire voltage value Vdata.

In this manner according to the present embodiment, a pixel driving device can be realized that corrects current supplied to an organic EL element 101 based on image data supplied in operation to reduce the effect of fluctuations of the threshold voltage and irregularities between pixels for the current amplification factor in each displayed pixel 21(i,j). Therefore, with this pixel driving device, it becomes possible to control the deterioration in picture quality in a display image by the display device 1 originating in this type of fluctuation and irregularity.

Further, the display device 1 according to the present embodiment has the ability to acquire a threshold voltage Vth, a ($C/\beta$) value, and a ($\Delta\beta/\beta$) which indicates the irregularity of $\beta$, as property parameters of each pixel with a common circuit in a pixel driving device.

Therefore, display device 1 can simplify the constitution of a pixel driving device or a display device 1 in providing the above described correction without the need to equip an individual circuit to measure the irregularity of $\beta$ or a circuit to measure the threshold voltage Vth.

Moreover, various forms of the embodiment of the present invention can be considered without limitation to the embodiment described above.

For example, a description is given in the present embodiment demonstrating an organic EL element as the light emitting element. However, the light emitting element is not limited to an organic EL element and may be, for example, an inorganic EL element or an LED.

Although a description is given in the present embodiment of applying the present invention to a display device 1 having an organic EL panel 21, the present invention is not limited to this example. For example, application may also be made to an exposure device that provides a light emitting element array in which a plurality of pixels having a light emitting element (an organic EL element 101 etc.) are arranged in a single direction and irradiates an outgoing beam from a light emitting element array onto a photoreceptor drum based on image data to expose a photoreceptor on a drum. An exposure device adopting the present embodiment has the ability to control deterioration of the exposure conditions due to irregularities in the properties between pixels and deterioration over time of pixel properties.

The present embodiment enables the setting of two, t1 and t2, as the settling time t that satisfies $(C/\beta)/t<1$. However, three or more settling times may also be set that satisfy this condition.

The present embodiment is such that control unit 16 performs a conversion on every RGB using an LUT 123 on supplied image data. However, the control unit 16 may also perform this type of conversion on image data by introducing and calculating an equation instead of utilizing the LUT 123.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-305716 filed on Nov. 28, 2008 and including specification, claims, drawings and summary. The disclosure of the above Japanese Patent Application is incorporated herein by reference in its entirety.

What is claimed is:

1. A pixel driving device for driving a pixel, connected to a signal line, and comprising a light emitting element, and a drive transistor for controlling current supplied to the light emitting element by one end of a current path of the drive transistor being connected to one end of the light emitting element, comprising:

a memory for storing property parameters that relate to electrical properties of the pixel;

an image data conversion circuit that converts image data comprising a digital signal based on a conversion property set in the image data conversion circuit and generates an original gradation signal comprising a digital signal;

a signal correction circuit for outputting a corrected gradation signal comprising a digital signal, by adding a correction amount set based on a property parameter stored in the memory, to the original gradation signal; and a drive signal impressing circuit for generating a drive signal comprising an analog signal based on the corrected gradation signal after the corrected gradation signal is input, and impressing the drive signal on one end of the signal line;

wherein the original gradation signal generated by the image data conversion circuit has a value that corresponds to a gradation value of the digital signal of the image data, and a maximum value of the digital signal of the original gradation signal is set to a value equal to or smaller than a value that is acquired by subtracting a value corresponding to the correction amount in the signal correction circuit from a maximum value in an input range of the drive signal impressing circuit.

2. The pixel driving device according to claim 1, wherein the conversion property of the image data conversion circuit is set for each emitting color of a light emitting device.

3. The pixel driving device according to claim 1, wherein the image data conversion circuit has a conversion table in which conversion values having the conversion property are stored for all gradation values that the image data can have, and the image data conversion circuit generates the original gradation signal by referencing the conversion table.

4. The pixel driving device according to claim 1, wherein the conversion property in the image data conversion circuit is set so that the relation between a change of the original gradation signal and a change of the gradation value of the image data shows a predetermined gamma property.

5. The pixel driving device according to claim 1, wherein:

the corrected gradation signal has a same number of bits as a number of bits of the image data, the drive signal impressing circuit comprises a digital-to-analog conversion circuit which converts the input corrected gradation signal to generate the analog drive signal, and an input range of the digital-to-analog conversion circuit has a value that corresponds to the number of bits of the image data.

6. The pixel driving device according to claim 5, wherein the digital-to-analog conversion circuit has:

a gradation voltage generation circuit for generating a plurality of gradation voltages that correspond to the number of bits of the image data, and a gradation voltage selection circuit for selecting one of the plurality of gradation voltages based on the input corrected gradation signal and outputting the selected gradation voltage as the drive signal, and wherein the plurality of gradation voltages generated by the gradation voltage generation circuit are set at equal intervals with the exception of the lowest gradation voltage.

7. The pixel driving device according to claim 6, wherein a voltage difference between the lowest gradation voltage and a first gradation voltage in the plurality of gradation voltages is set to a value that corresponds to an initial property value of a threshold voltage of the drive transistor of the pixel.

8. The pixel drive device according to claim 1, further comprising:

a property parameter acquisition circuit for acquiring the property parameters based on a value of a voltage at the one end of the signal line; and the memory stores the property parameters acquired by the property parameter acquisition circuit.

9. The pixel driving device according to claim 8, further comprising:

a voltage impressing circuit that impresses a reference voltage having a voltage value that exceeds a threshold voltage of the drive transistor, on the drive transistor and that is connected to the one end of the signal line, and a voltage measurement circuit that is connected to the one end of the signal line after each of a predetermined plurality of different settling time values elapse from the time when the connection between the one end of the signal line and the voltage impressing circuit is interrupted subsequent to the reference voltage being impressed for a predetermined length of time;

wherein the voltage measurement circuit acquires the voltage value of the one end of the signal line as a measured voltage when connected with the one end of the signal line; and wherein the property parameter acquisition circuit acquires the threshold voltage of the drive transistor and a current amplification factor of the pixel drive circuit as the property parameters based on a plurality of voltage values of measured voltages acquired by the voltage measurement circuit for the plurality of settling times.

10. A light emitting device, comprising:

a pixel, connected to a signal line, having a light emitting element, and a drive transistor which is for controlling current supplied to the light emitting element, and whose one end of a current path is connected to one end of the light emitting element;

a memory for storing property parameters that relate to electrical properties of the pixel;

an image data conversion circuit for converting input image data comprising a digital signal based on preset conversion properties and generating an original gradation signal comprising a digital signal;

a signal correction circuit for outputting a corrected gradation signal comprising a digital signal, by adding a correction amount set based on a property parameter stored in the memory, to the original gradation signal; and a drive signal impressing circuit for generating a drive signal comprising an analog signal based on the corrected gradation signal after the corrected gradation signal is input and impressing the drive signal on one end of the signal line;

wherein the original gradation signal generated by the image data conversion circuit has a value that corresponds to a gradation value of the digital signal of the image data, and a maximum value of the digital signal of the original gradation signal is set to a value equal to or smaller than a value that is acquired by subtracting a value corresponding to the correction amount set in the signal correction circuit from a maximum value in an input range of the drive signal impressing circuit.

11. The light emitting device according to claim 10, wherein a conversion property of the image data conversion circuit is set for each emitting color of the light emitting device.

12. The light emitting device according to claim 11, further comprising a plurality of pixels, wherein the color of the light emitted from the light emitting element of each pixel is any one of a plurality of display colors performed in color display.

13. The light emitting device according to claim 10, wherein the image data conversion circuit has a conversion table in which conversion values having the conversion properties are stored for all gradation values that the image data can have, and the image data conversion circuit generates the original gradation signal by referencing the conversion table.

14. The light emitting device according to claim 10, wherein the conversion properties in the image data conversion circuit are set so that the relation between a change of the original gradation signal and a change of the gradation value of the image data shows a predetermined gamma property.

15. The light emitting device according to claim 10, wherein:

the corrected gradation signal has a same number of bits as a number of bits of the image data, the drive signal impressing circuit has a digital-to-analog conversion circuit which converts the input corrected gradation signal to generate the analog drive signal, and an input range of the digital-to-analog conversion circuit has a value that corresponds to the number of bits of the image data.

16. The light emitting device according to claim 15, wherein the digital-to-analog conversion circuit has:

a gradation voltage generation circuit for generating a plurality of gradation voltages that correspond to the number of bits of the image data, and a gradation voltage selection circuit for selecting one of the plurality of gradation voltages based on the corrected gradation signal and outputting the selected gradation voltage as the drive signal, and wherein the plurality of gradation voltages generated by the gradation voltage generation circuit are set at equal intervals with the exception of the lowest gradation voltage.

17. The light emitting device according to claim 16, wherein a voltage difference between the lowest gradation voltage and a first gradation voltage in the plurality of gradation voltages is set to a value that corresponds to an initial property value of a threshold voltage of the drive transistor of the pixel.

18. The light emitting device according to claim 10, further comprising a property parameter acquisition circuit for acquiring the property parameters based on a value of a voltage at one end of the signal line; and wherein the memory stores the property parameters acquired by the property parameter acquisition circuit.

19. The light emitting device according to claim 18, further comprising:

a voltage impressing circuit that impresses a reference voltage having a voltage value that exceeds a threshold voltage of the drive transistor, on the drive transistor and that is connected to the one end of the signal line, and a voltage measurement circuit that is connected to the one end of the signal line after each of a predetermined plurality of different settling time values elapse from the time when the connection between the one end of the signal line and the voltage impressing circuit is interrupted subsequent to the reference voltage being impressed for a predetermined length of time;

wherein the voltage measurement circuit acquires the voltage value of the one end of the signal line as a measured voltage when connected with the one end of the signal line; and wherein the property parameter acquisition circuit acquires the threshold voltage of the drive transistor and a current amplification factor of the pixel drive circuit as the property parameters based on a plurality of voltage values of measured voltages acquired by the voltage measurement circuit for the plurality of settling times.

* * * * *